United States Patent
Tanaka et al.

(10) Patent No.: US 10,838,561 B2
(45) Date of Patent: Nov. 17, 2020

(54) DETECTION APPARATUS AND DISPLAY APPARATUS WITH DETECTION FUNCTION

(71) Applicant: Japan Display Inc., Tokyo (JP)

(72) Inventors: Chihiro Tanaka, Tokyo (JP); Hayato Kurasawa, Tokyo (JP); Naoki Takada, Tokyo (JP); Toshihiko Tanaka, Tokyo (JP); Tatsuya Wakimoto, Tokyo (JP); Keita Sasanuma, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 50 days.

(21) Appl. No.: 16/256,197

(22) Filed: Jan. 24, 2019

(65) Prior Publication Data

US 2019/0243484 A1    Aug. 8, 2019

(30) Foreign Application Priority Data

Feb. 8, 2018  (JP) .................................. 2018-020863

(51) Int. Cl.
*G06F 3/041*    (2006.01)
*G06F 3/044*    (2006.01)

(52) U.S. Cl.
CPC .... *G06F 3/044* (2013.01); *G06F 2203/04101* (2013.01); *G06F 2203/04107* (2013.01); *G06F 2203/04111* (2013.01)

(58) Field of Classification Search
None
See application file for complete search history.

(56) References Cited

U.S. PATENT DOCUMENTS

| 2010/0033443 | A1  | 2/2010  | Hashimoto |
| 2013/0188104 | A1* | 7/2013  | Aoki ................. G02F 1/134336 349/12 |
| 2014/0022185 | A1* | 1/2014  | Ribeiro .................. G06F 3/017 345/173 |
| 2016/0188114 | A1* | 6/2016  | Kim ...................... G06F 3/0418 345/174 |
| 2017/0102342 | A1* | 4/2017  | Iwami ..................... G06F 3/044 |
| 2017/0285846 | A1  | 10/2017 | Mizuhashi et al. |
| 2018/0113547 | A1* | 4/2018  | Miyake ................. G06F 3/0412 |

FOREIGN PATENT DOCUMENTS

| JP | 2010-039816 A | 2/2010 |
| JP | 2015-022563 A | 2/2015 |
| JP | 2017-182348 A | 10/2017 |

* cited by examiner

*Primary Examiner* — Roy P Rabindranath
(74) *Attorney, Agent, or Firm* — Michael Best & Friedrich LLP

(57) ABSTRACT

A detection apparatus comprising: a first substrate; a detection region having a first detection side extending along a first direction parallel with a surface of the first substrate and a second detection side extending along a second direction intersecting the first direction; a frame region provided outside the detection region and having a first frame region extending along the first detection side and a second frame region extending along the second detection side; a first electrode provided at a position overlapping the detection region of the first substrate, the first electrode extending in the second direction; a second electrode provided at a position overlapping the detection region, the second electrode extending in the first direction; a plurality of terminals provided in the first frame region of the first substrate and arrayed in the first direction, and including a first terminal; a first wire; and a second wire.

14 Claims, 19 Drawing Sheets

DETECTION APPARATUS AND DISPLAY APPARATUS WITH DETECTION FUNCTION

CROSS-REFERENCE TO RELATED APPLICATIONS

This application claims priority from Japanese Application No. 2018-020863, filed on Feb. 8, 2018, the contents of which are incorporated by reference herein in its entirety.

BACKGROUND

1. Technical Field

The present disclosure relates to a detection apparatus and a display apparatus with a detection function.

2. Description of the Related Art

Touch detection apparatuses capable of detecting an external proximity object, what are called touch panels, have recently been attracting attention. Touch panels are mounted on or integrated with a display apparatus, such as a liquid crystal display apparatus, and used as display apparatuses with a touch detection function. In touch panels, detection electrodes and drive electrodes are coupled to terminals via respective wires. The terminals are coupled to a wiring substrate. The wires may possibly be broken because they have a small width. By coupling the wires to both ends of the detection electrodes, coupling between the detection electrodes and the wiring substrate can be secured with one of the wires when the other thereof is broken (e.g., Japanese Patent Application Laid-open Publication No. 2010-39816 A).

An increase in the number of wires coupled to the detection electrodes and the drive electrodes increases the number of terminals that couple the wires to the wiring substrate. In addition, a plurality of wires coupled to one electrode need to be electrically coupled in the wiring substrate. As a result, it is necessary to use a multilayered wiring substrate and couple the wires in the wiring substrate. This configuration may possibly increase the cost.

SUMMARY

A detection apparatus according to one embodiment of the present disclosure includes a first substrate, a detection region having a first detection side extending along a first direction parallel with a surface of the first substrate and a second detection side extending along a second direction intersecting the first direction, a frame region provided outside the detection region and having a first frame region extending along the first detection side and a second frame region extending along the second detection side, a first electrode provided at a position overlapping the detection region of the first substrate, the first electrode extending in the second direction, a second electrode provided at a position overlapping the detection region, the second electrode extending in the first direction, a plurality of terminals provided in the first frame region of the first substrate and arrayed in the first direction, and including a first terminal, a first wire that couples a first end of the first electrode in the second direction and the first terminal, and a second wire provided in the second frame region of the first substrate and coupling a second end opposite to the first end of the first electrode and the first terminal.

A detection apparatus according to one embodiment of the present disclosure includes a first substrate, a detection region having a first detection side extending along a first direction parallel with a surface of the first substrate, a frame region provided outside the detection region and having a first frame region extending along the first detection side, a first electrode provided at a position overlapping the detection region of the first substrate, the first electrode extending in a second direction intersecting the first direction, a second electrode provided at a position overlapping the detection region, the second electrode extending in the first direction, a plurality of terminals provided in the first frame region of the first substrate, arrayed in the first direction, and including a first terminal, and a first wire and a second wire that couple the first electrode and the first terminal. The first electrode includes a first partial electrode and a second partial electrode, the first partial electrode and the second partial electrode are provided along the second direction, and electrically coupled at respective first ends, the first wire is coupled to a second end of the first partial electrode, and the second wire is coupled to a second end of the second partial electrode.

A display apparatus with a detection function according to one embodiment of the present disclosure includes the detection apparatus described above, and a display layer configured to display an image. A display drive signal is supplied to at least one of the first electrode and the second electrode in a period for displaying the image.

DETAILED DESCRIPTION

Figure 1:
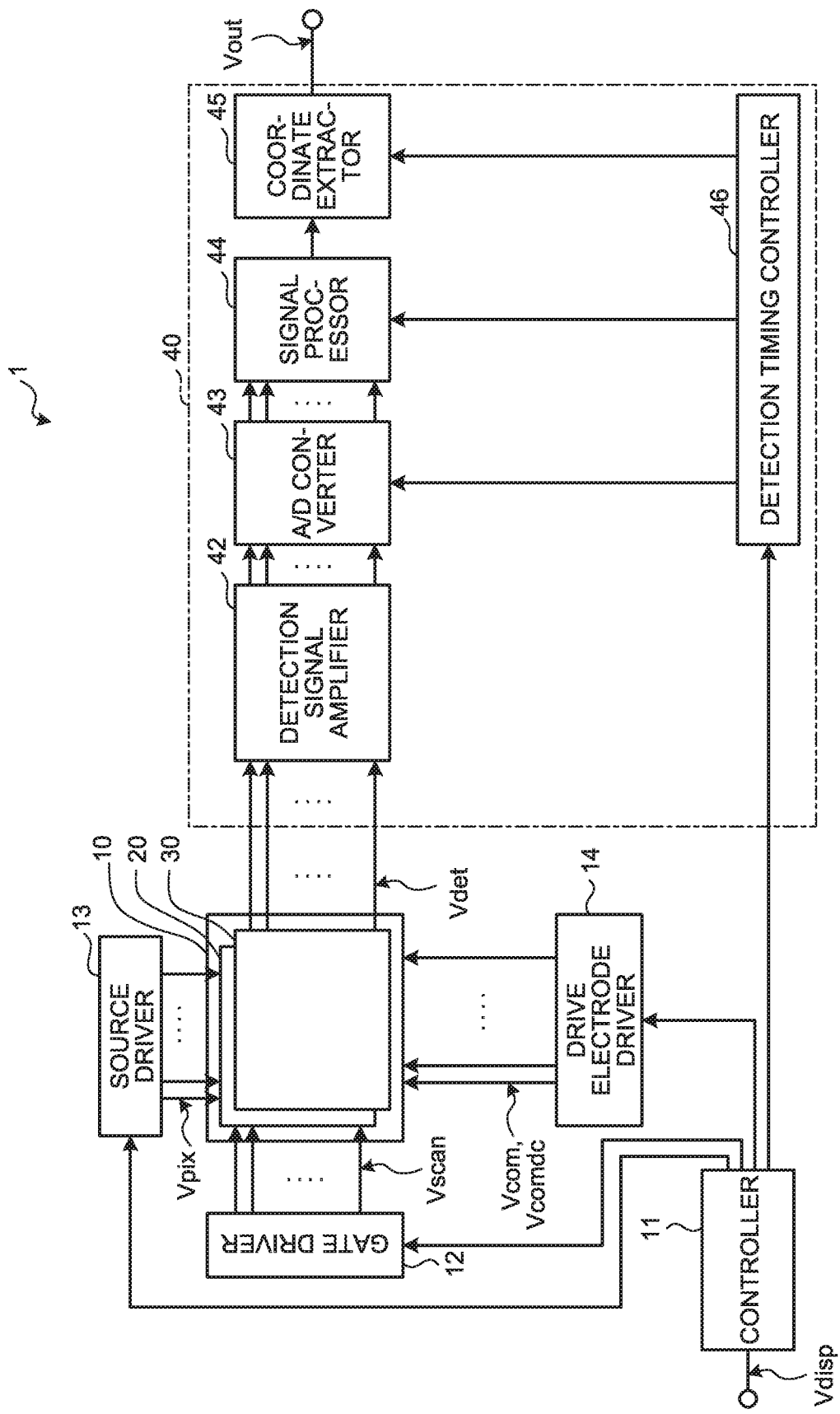
FIG. 1 is a block diagram of an exemplary configuration of a display apparatus with a detection function according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

FIG. 1 is a block diagram of an exemplary configuration of a display apparatus with a detection function according to a first embodiment of the present disclosure. A display apparatus with a detection function 1 includes a display device with a detection function 10, a controller 11, a gate driver 12, a source driver 13, a drive electrode driver 14, and a detector 40. The display device with a detection function 10 is an apparatus in which a display panel 20 and a detection apparatus 30 are integrated. The apparatus in which the display panel 20 and the detection apparatus 30 are integrated means an apparatus that shares part of substrates or electrodes included in the detection apparatus 30 and the display panel 20, for example. The display device with a detection function 10 may be an apparatus in which the detection apparatus 30 is mounted on the display panel 20. The display panel 20 is a liquid crystal display apparatus including liquid crystals serving as display elements, for example. The display panel 20 may be an organic light-emitting diode (OLED) display panel including light-emitting elements serving as display elements or an inorganic light-emitting diode (μ-LED or Mini-LED) display, for example. Alternatively, the display panel 20 may be an electrophoretic display (EPD) panel including electrophoretic elements serving as display elements. The gate driver 12, the source driver 13, or the drive electrode driver 14 may be provided in the display device with a detection function 10.

The display panel 20 is an apparatus that sequentially scans horizontal lines one by one to perform display based on scanning signals Vscan supplied from the gate driver 12.

The controller 11 is a circuit (control device) that controls the gate driver 12, the source driver 13, the drive electrode driver 14, and the detector 40. The controller 11 supplies control signals to the gate driver 12, the source driver 13, the drive electrode driver 14, and the detector 40 based on video signals Vdisp supplied from outside.

The gate driver 12 is a circuit that sequentially selects one horizontal line to be an object of display drive in the display device with a detection function 10 based on the control signals supplied from the controller 11.

The source driver 13 is a circuit that supplies pixel signals Vpix to respective pixels Pix of the display device with a detection function 10 based on the control signals supplied from the controller 11.

The drive electrode driver 14 is a circuit that supplies drive signals Vcom or display drive signals Vcomdc to second electrodes Tx of the display device with a detection function 10 based on the control signals supplied from the controller 11. The drive signal Vcom is an AC rectangular wave at a predetermined frequency (e.g., a frequency of the order of several kilohertz to several hundred kilohertz), for example. The AC waveform of the drive signal Vcom may be a sine wave or a triangular wave.

The detection apparatus 30 sequentially scans detection blocks one by one to perform touch detection based on the drive signals Vcom supplied from the drive electrode driver 14. The detection apparatus 30 is a capacitance touch panel, for example. The detection apparatus 30 includes drive electrodes and detection electrodes. The detection apparatus 30 supplies detection signals Vdet corresponding to changes in capacitance between the drive electrodes and the detection electrodes caused by proximity or contact of an external object, such as a finger.

The detector 40 is a circuit that determines whether a touch is made on the detection apparatus 30 based on the control signals supplied from the controller 11 and the detection signals Vdet supplied from the detection apparatus 30 of the display device with a detection function 10. If a touch is detected, the detector 40 calculates the coordinates of the touch in a touch detection region, for example. The detector 40 includes a detection signal amplifier 42, an analog/digital (A/D) converter 43, a signal processor 44, a coordinate extractor 45, and a detection timing controller 46.

The detection signal amplifier 42 is an integrating circuit that amplifies the detection signals Vdet supplied from the detection apparatus 30, for example. The A/D converter 43 samples analog signals output from the detection signal amplifier 42 to convert them into digital signals at a timing synchronized with the drive signals Vcom.

The signal processor 44 is a logic circuit that determines whether a touch is made on the display device with a detection function 10 based on the output signals from the A/D converter 43. The signal processor 44 performs processing of extracting a signal (absolute value |ΔV|) of difference between the detection signals caused by a finger. The signal processor 44 compares the absolute value |ΔV| with a predetermined threshold voltage. If the absolute value |ΔV| is lower than the threshold voltage, the signal processor 44 determines that an object to be detected is in a non-contact state. By contrast, if the absolute value |ΔV| is equal to or higher than the threshold voltage, the signal processor 44 determines that an object to be detected is in a contact state or a proximity state. The detector 40 thus can perform touch detection.

The coordinate extractor 45 is a logic circuit that calculates, when the signal processor 44 detects a touch, the touch panel coordinates of the touch. The coordinate extractor 45 outputs the touch panel coordinates as output signals Vout. The detector 40 does not necessarily include the coordinate extractor 45 and may output the detection signals Vdet as the output signals Vout without calculating the touch panel coordinates. The detector 40 may output the output signals Vout to the controller 11. The controller 11 can perform a predetermined display or detection operation based on the output signals Vout.

Figure 2:
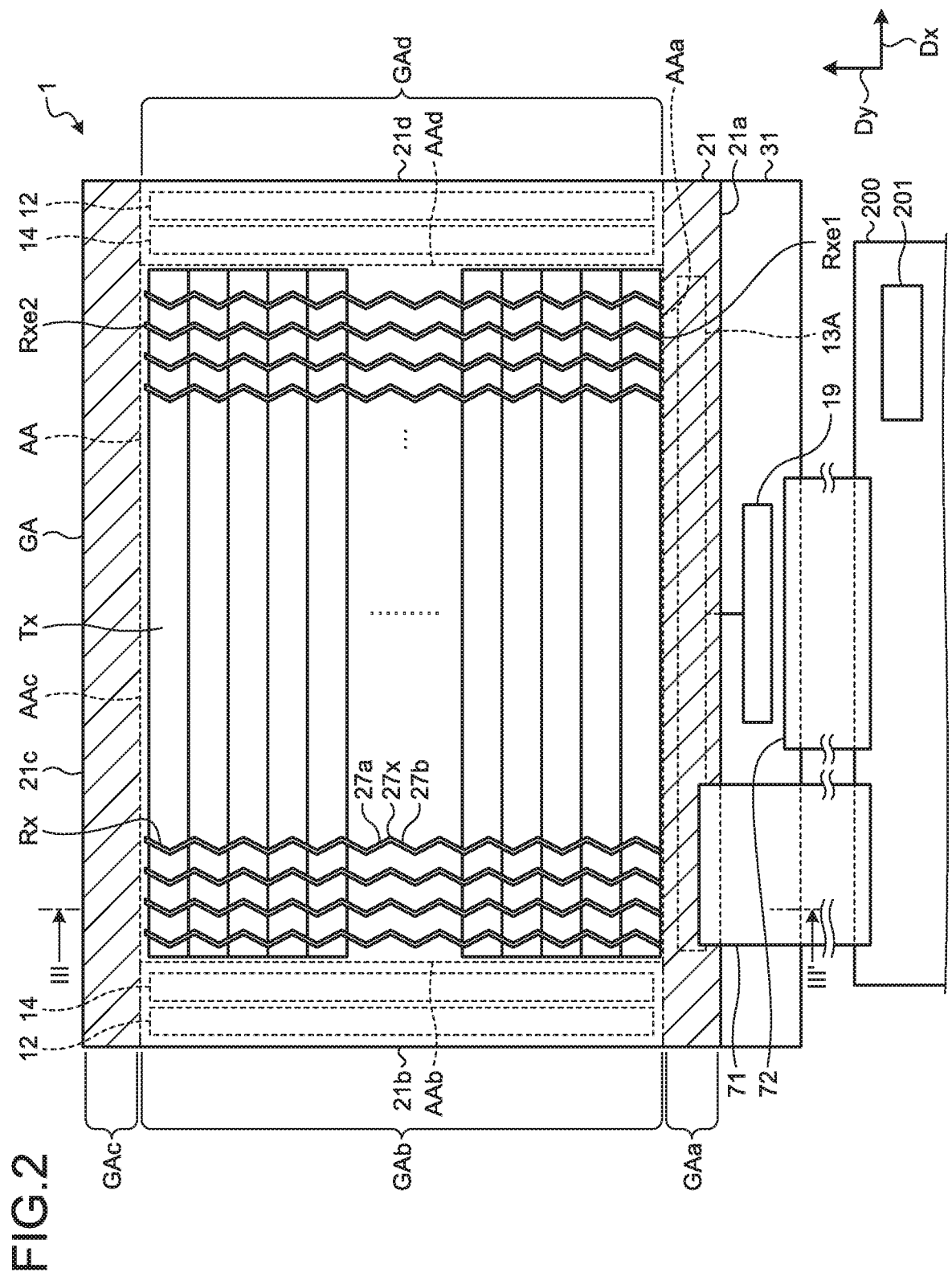
FIG. 2 is a plan view schematically illustrating the display apparatus with a detection function according to the first embodiment.
Figure 3:
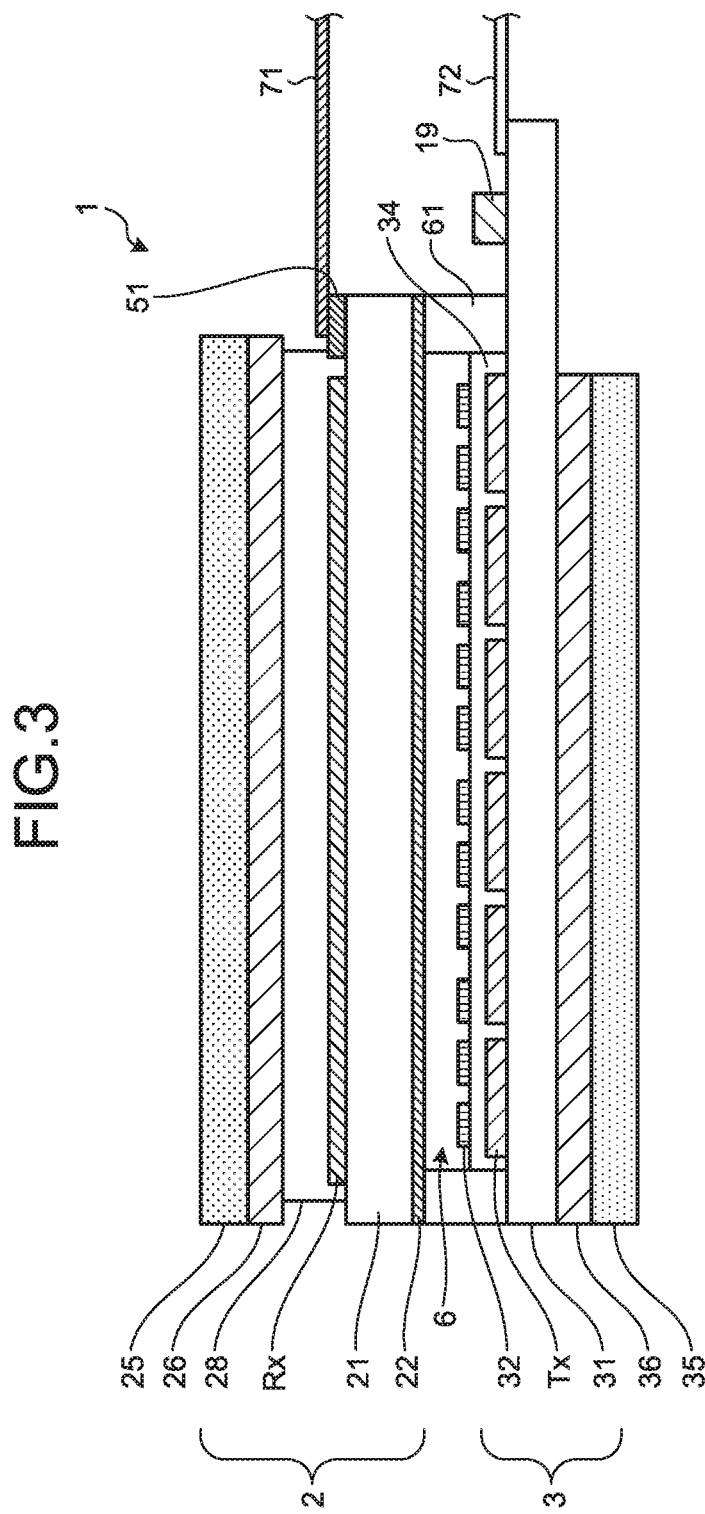
FIG. 3 is a sectional view along line III-III' of FIG. 2.

The following describes an exemplary configuration of the display apparatus with a detection function 1 according to the present embodiment in greater detail. FIG. 2 is a plan view schematically illustrating the display apparatus with a detection function according to the first embodiment. FIG. 3 is a sectional view along line III-III' of FIG. 2. In FIG. 2, first electrodes Rx and second electrodes Tx provided on different substrates are schematically illustrated in an overlapping manner.

As illustrated in FIG. 3, the display apparatus with a detection function 1 includes a counter substrate 2, a pixel substrate 3, a liquid crystal layer 6, a polarizing plate 25, and a polarizing plate 35. The counter substrate 2 is disposed facing the pixel substrate 3 in a direction perpendicular to the surface of the pixel substrate 3. The liquid crystal layer 6 is provided between the pixel substrate 3 and the counter substrate 2.

The counter substrate 2 includes a first substrate 21, first electrodes Rx, and a color filter 22. The first electrodes Rx are detection electrodes of the detection apparatus 30 and provided on one surface of the first substrate 21. The color filter 22 is provided on the other surface of the first substrate 21. A protective layer 28 is provided on the first electrodes Rx. The protective layer 28 is made of a translucent resin, such as an acrylic resin. The polarizing plate 25 is provided on the protective layer 28 with an adhesive layer 26 interposed therebetween. The first substrate 21 is provided with a wiring substrate 71. The first electrodes Rx are electrically coupled to the wiring substrate 71 via terminals 51. The first substrate 21 is a translucent glass substrate that enables visible light to pass therethrough. Alternatively, the first substrate 21 may be a translucent resin substrate or resin film made of a resin, such as polyimide. The color filter 22 may be provided on a second substrate 31. The wiring substrate 71 is a flexible printed circuit board, for example.

The pixel substrate 3 includes the second substrate 31, pixel electrodes 32, and the second electrodes Tx. The second substrate 31 is provided with circuits, such as a gate scanner included in the gate driver 12, thin-film transistor (TFT) elements Tr, such as TFTs, and various kinds of wiring, such as gate lines GCL and signal lines SGL (refer to FIG. 4). The pixel electrodes 32 are arrayed in a matrix (row-column configuration) on one surface of the second substrate 31. The second electrodes Tx are provided between the second substrate 31 and the pixel electrodes 32. The pixel electrodes 32 are insulated from the second electrodes Tx with an insulating layer 34 interposed therebetween. The polarizing plate 35 is provided on the other surface of the second substrate 31 with an adhesive layer 36 interposed therebetween. While the pixel electrodes 32 according to the present embodiment are provided on the upper side of the second electrodes Tx, the second electrodes Tx may be provided on the upper side of the pixel electrodes 32. In other words, the pixel electrodes 32 may be disposed between the second substrate 31 and the second electrodes Tx.

The second substrate 31 is provided with a drive integrated circuit (IC) 19 and a wiring substrate 72. The drive IC 19 includes all or part of the functions of the controller 11 illustrated in FIG. 1. The wiring substrate 72 is a flexible printed circuit board, for example.

In the present specification, the "upper side" indicates a direction from the second substrate 31 toward the first substrate 21 in a direction perpendicular to the surface of the first substrate 21, and the "lower side" indicates a direction from the first substrate 21 toward the second substrate 31. The "planar view" indicates a view seen in the direction perpendicular to the surface of the first substrate 21.

The first substrate 21 and the second substrate 31 are disposed facing each other with a predetermined gap formed by a sealing part 61 interposed therebetween. The liquid crystal layer 6 is provided in the space surrounded by the first substrate 21, the second substrate 31, and the sealing part 61. The liquid crystal layer 6 modulates light passing therethrough depending on the state of an electric field. The liquid crystal layer 6, for example, includes liquid crystals in a horizontal electric field mode, such as the in-plane switching (IPS) mode including the fringe field switching (FFS) mode. The liquid crystal layer 6 is provided as a display functional layer that displays an image. Orientation films may be provided between the liquid crystal layer 6 and the pixel substrate 3 and between the liquid crystal layer 6 and the counter substrate 2 illustrated in FIG. 3.

As illustrated in FIG. 2, the first substrate 21 has regions corresponding to a detection region AA of the detection apparatus 30 (refer to FIG. 1) and a frame region GA provided outside the detection region AA. The detection region AA is provided with detection elements, such as the first electrodes Rx and the second electrodes Tx. In other words, the detection region AA can detect whether a touch is made by a finger or the like and fine unevenness, such as fingerprints and palm prints. The detection region AA according to the present embodiment has a rectangular shape and has a first detection side AAa, a second detection side AAb, a third detection side AAc, and a fourth detection side AAd. The first detection side AAa, the second detection side AAb, the third detection side AAc, and the fourth detection side AAd are the outer periphery of the detection region AA. In other words, the detection region AA is the region surrounded by the first detection side AAa, the second detection side AAb, the third detection side AAc, and the fourth detection side AAd.

The first detection side AAa extends along a first direction Dx. The second detection side AAb extends along a second direction Dy and connects the first detection side AAa and the third detection side AAc. The third detection side AAc extends along the first direction Dx and is provided side by side with the first detection side AAa in the second direction Dy. The fourth detection side AAd extends along the second direction Dy and is provided side by side with the second detection side AAb in the first direction Dx. The first detection side AAa, the second detection side AAb, the third detection side AAc, and the fourth detection side AAd have a continuous annular shape. Alternatively, the first detection side AAa, the second detection side AAb, the third detection side AAc, and the fourth detection side AAd may be separated from each other. The detection region AA may have a polygonal shape with four or more sides and angles, for example, and have a fifth detection side extending in a direction different from the first direction Dx and the second direction Dy between the first detection side AAa and the second detection side AAb.

The first direction Dx and the second direction Dy are parallel with the surface of the first substrate 21. The first direction Dx orthogonally intersects the second direction Dy. The first direction Dx may intersect the second direction Dy not orthogonally.

The first substrate 21 has a first substrate side 21a, a second substrate side 21b, a third substrate side 21c, and a fourth substrate side 21d. The first substrate side 21a, the second substrate side 21b, the third substrate side 21c, and the fourth substrate side 21d are the outer periphery of the first substrate 21. The first substrate 21 has a rectangular shape in planar view. The first substrate side 21a extends along the first direction Dx. The second substrate side 21b extends along the second direction Dy and connects the first substrate side 21a and the third substrate side 21c. The third substrate side 21c extends along the first direction Dx and is provided side by side with the first substrate side 21a in the second direction Dy. The fourth substrate side 21d extends along the second direction Dy and is provided side by side with the second substrate side 21b in the first direction Dx.

The first substrate side 21a is provided side by side with the first detection side AAa. The second substrate side 21b is provided side by side with the second detection side AAb. The third substrate side 21c is provided side by side with the third detection side AAc. The fourth substrate side 21d is provided side by side with the fourth detection side AAd. The first substrate side 21a to the fourth substrate side 21d are parallel with the first detection side AAa to the fourth detection side AAd, respectively. The structure is not limited thereto, and they may be in non-parallel with each other. Alternatively, at least part of the first substrate side 21a to the fourth substrate side 21d may be a curved line.

The frame region GA has a first partial frame region GAa, a second partial frame region GAb, a third partial frame region GAc, and a fourth partial frame region GAd. In FIG. 2, the first partial frame region GAa and the third partial frame region GAc are hatched. The first partial frame region GAa is a region extending along the first detection side AAa in the frame region GA. The first partial frame region GAa is surrounded by the first detection side AAa, the first substrate side 21a, part of the second substrate side 21b, and part of the fourth substrate side 21d. The second partial frame region GAb is a region extending along the second detection side AAb in the frame region GA. The second partial frame region GAb is surrounded by the second detection side AAb, the second substrate side 21b, an extension of the first detection side AAa, and an extension of the third detection side AAc. The third partial frame region GAc is a region extending along the third detection side AAc in the frame region GA. The third partial frame region GAc is surrounded by the third detection side AAc, the third substrate side 21c, part of the second substrate side 21b, and part of the fourth substrate side 21d. The fourth partial frame region GAd is a region extending along the fourth detection side AAd in the frame region GA. The fourth partial frame region GAd is surrounded by the fourth detection side AAd, the fourth substrate side 21d, an extension of the first detection side AAa, and an extension of the third detection side AAc.

The drive IC 19 is mounted on a region of the second substrate 31 on the first partial frame region GAa side. The drive IC 19 is a chip on glass (COG), for example. The drive IC 19 includes various circuits required for a display operation, such as the controller 11, the gate driver 12, the source driver 13, and the drive electrode driver 14 illustrated in FIG. 1. The drive IC 19 may be a chip on film (COF) disposed on the wiring substrate 72.

The gate driver 12, a coupling circuit 13A of the source driver 13, or the drive electrode driver 14 according to the present embodiment may be provided on the second substrate 31. The drive IC 19 and the drive electrode driver 14 are provided in the frame region GA. The drive IC 19 may include at least one of the source driver 13 and the drive electrode driver 14. With this configuration, the frame region GA can have a smaller width. The coupling circuit 13A is a multiplexer, for example. The wiring substrate 72 is coupled to the drive IC 19, and the drive IC 19 is supplied with the video signals Vdisp and the power supply voltage from outside via the wiring substrate 72.

The wiring substrate 71 and the wiring substrate 72 are coupled to a control substrate 200. A detection IC 201 is mounted on the control substrate 200. With this configuration, the detection IC 201 is electrically coupled to the first electrodes Rx via the wiring substrate 71. The detection IC 201 includes part or all of the functions of the detector 40 (refer to FIG. 1). The detection IC 201 may be disposed on the wiring substrate 71. An analog front end (AFE) may be provided on the wiring substrate 71, for example, and the detection IC 201 may include only part of the functions of the detector 40, such as the detection signal amplifier 42 and the A/D converter 43. One of the detection IC 201 and the drive IC 19 may be coupled to both of the first electrodes Rx and the second electrodes Tx via the wiring substrate 71 and the wiring substrate 72 and include the functions of the detection IC 201 and the drive IC 19.

As illustrated in FIG. 2, the second electrodes Tx extend in the first direction Dx and are arrayed in the second direction Dy. The first electrodes Rx extend in the second direction Dy and are arrayed in the first direction Dx. The first electrodes Rx extend in a direction intersecting the second electrodes Tx in planar view. The first electrodes Rx are electrically coupled to the wiring substrate 71 via respective first wires LA and second wires LB (refer to FIG. 5). The second electrodes Tx are coupled to the drive electrode driver 14. The second electrodes Tx are made of a translucent conductive material, such as indium tin oxide (ITO). The first electrodes Rx are made of a metal material, such as aluminum and aluminum alloy. The second electrodes Tx may be made of a metal material, and the first electrodes Rx may be made of a translucent conductive material, such as ITO. The use of the first electrodes Rx made of a metal material can reduce resistance to the detection signals Vdet.

The first electrodes Rx and the second electrodes Tx are provided in the detection region AA. First ends Rxe1 of the respective first electrodes Rx are arrayed in the first direction Dx along the first detection side AAa. Similarly, second ends Rxe2 of the respective first electrodes Rx are arrayed in the first direction Dx along the third detection side AAc. The second end Rxe2 is the end opposite to the first end Rxe1. In other words, the detection region AA overlaps the first electrodes Rx and the second electrodes Tx. Alternatively, the detection region AA overlaps a plurality of pixels Pix (refer to FIG. 4).

Capacitance is formed at the intersections of the first electrodes Rx and the second electrodes Tx. To perform a mutual capacitance touch detection operation in the display apparatus with a detection function 1, the drive electrode driver 14 sequentially scans the second electrodes Tx and supplies the drive signals Vcom to the selected second electrodes Tx. The first electrodes Rx output the detection signals Vdet corresponding to capacitance changes caused by a finger or the like in contact with or in proximity to the display apparatus with a detection function 1. The display apparatus with a detection function 1 thus performs touch detection. The detection apparatus 30 (refer to FIG. 1)

includes the second electrodes Tx provided on the pixel substrate 3 and the first electrodes Rx provided on the counter substrate 2.

As illustrated in FIG. 2, the first electrode Rx has a zigzag shape and extends in the second direction Dy as a whole. The first electrode Rx includes a plurality of first thin wires 27a, a plurality of second thin wires 27b, and a plurality of bends 27x, for example. The second thin wire 27b extends in the direction intersecting the first thin wire 27a. The second thin wire 27b and the first thin wire 27a extend in different directions. The bend 27x couples the first thin wire 27a and the second thin wire 27b. The first electrode Rx does not necessarily have a zigzag shape and may have another shape, such as a wavy, linear, or mesh shape. Dummy electrodes not serving as detection electrodes may be provided between the first electrodes Rx disposed side by side. The dummy electrode is a linear electrode similar to the first electrode Rx, for example, and may have a slit with which part of the dummy electrode is electrically disconnected. The dummy electrode may have a zigzag, wavy, linear, or mesh shape similarly to the first electrode Rx.

The first thin wires 27a and the second thin wires 27b are metal layers made of one or more of aluminum (Al), copper (Cu), silver (Ag), molybdenum (Mo), chromium (Cr), and tungsten (W). Alternatively, the first thin wires 27a and the second thin wires 27b are made of an alloy including one or more of the metal materials described above. The first thin wires 27a and the second thin wires 27b may be multilayered bodies composed of a plurality of conductive layers made of the metal materials described above or an alloy including one or more of the materials. The first thin wires 27a and the second thin wires 27b may be multilayered bodies composed of conductive layers made of translucent conductive oxide, such as ITO. Alternatively, the first thin wires 27a and the second thin wires 27b may be multilayered bodies composed of blackened films, black organic films, or black conductive organic films obtained by combining the metal materials described above and conductive layers.

The metal materials described above have resistance lower than that of translucent conductive oxide, such as ITO. The metal materials described above have a light-shielding property higher than that of the translucent conductive oxide. As a result, the transmittance may possibly be reduced, or the first electrodes Rx may possibly be visually recognized. The first thin wires 27a and the second thin wires 27b according to the present embodiment are disposed with a space larger than their width interposed therebetween. This configuration can reduce the resistance and prevent the first electrodes Rx from being visually recognized. As a result, the first electrodes Rx have lower resistance, and the display apparatus with a detection function 1 can have a smaller thickness, a larger screen, or higher definition.

Figure 4:
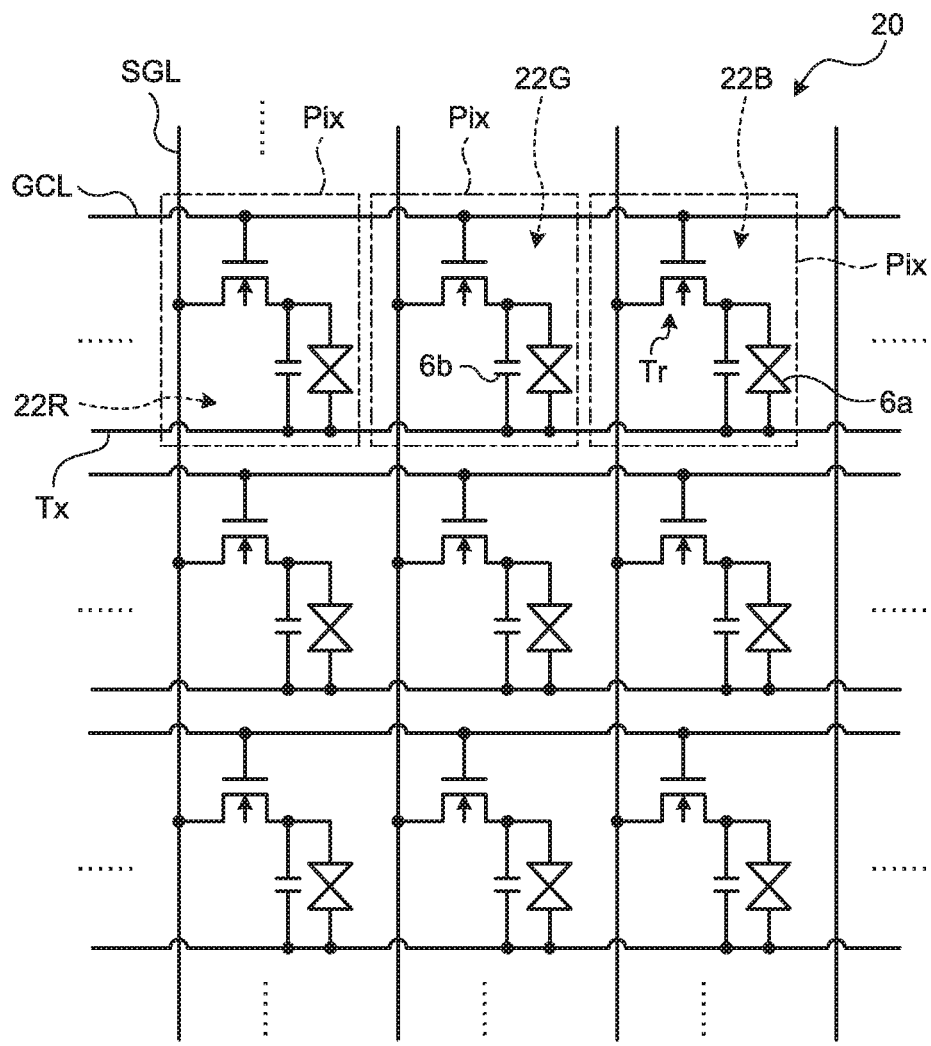
FIG. 4 is a circuit diagram of pixel arrangement in the display apparatus with a detection function according to the first embodiment.

FIG. 4 is a circuit diagram of pixel arrangement in the display apparatus with a detection function according to the first embodiment. The second substrate 31 (refer to FIG. 3) is provided with thin-film transistor elements (hereinafter, referred to as TFT elements) Tr and wiring, such as the data lines SGL and the gate lines GCL, as illustrated in FIG. 4. The TFT elements Tr are provided for the respective pixels Pix. The data lines SGL are wiring that supplies the pixel signals Vpix to the respective pixel electrodes 32. The gate lines GCL are wiring that supplies signals for driving the TFT elements Tr.

The display panel 20 illustrated in FIG. 4 includes a plurality of pixels Pix arrayed in a matrix (row-column configuration). The pixels Pix each include the TFT element Tr and a liquid crystal element 6a. The TFT element Tr is a thin-film transistor and is an n-channel metal oxide semiconductor (MOS) TFT in this example. The insulating layer 34 is provided between the pixel electrodes 32 and the second electrodes Tx (common electrodes), thereby forming holding capacitance 6b illustrated in FIG. 4.

The gate driver 12 illustrated in FIG. 1 sequentially selects the gate line GCL. The gate driver 12 applies the scanning signals Vscan to the gates of the TFT elements Tr of the respective pixels Pix via the selected gate line GCL. As a result, one row (one horizontal line) out of the pixels Pix is sequentially selected as an object of display drive. The source driver 13 supplies the pixel signals Vpix to the pixels Pix included in the selected horizontal line via the data lines SGL. The pixels Pix perform display in units of one horizontal line based on the supplied pixel signals Vpix. While the gate driver 12 according to the present embodiment is disposed in both of the second partial frame region GAb and the fourth partial frame region GAd, it may be disposed in one of the second partial frame region GAb and the fourth partial frame region GAd.

The extending direction of the second electrodes Tx according to the present embodiment is parallel with the extending direction of the gate lines GCL and intersect the extending direction of the data lines SGL. Alternatively, the extending direction of the gate lines GCL may intersect the extending direction of the second electrodes Tx, and the extending direction of the data lines SGL may be parallel with the extending direction of the second electrodes Tx.

The color filter 22 illustrated in FIG. 3, for example, includes periodically arrayed color areas 22R, 22G, and 22B of three colors of red (R), green (G), and blue (B), respectively. The color areas 22R, 22G, and 22B of the three colors of R, G, and B correspond to the respective pixels Pix illustrated in FIG. 4. As illustrated in FIG. 3, the color filter 22 faces the liquid crystal layer 6 in the direction perpendicular to the first substrate 21. The color areas corresponding to the respective pixels Pix may have another combination of colors as long as they are different colors. The color areas corresponding to the respective pixels Pix do not necessarily have a combination of three colors and may have a combination of four or more colors.

The second electrodes Tx illustrated in FIGS. 3 and 4 serve not only as common electrodes that supply a common potential to a plurality of pixels Pix in the display panel 20 but also as drive electrodes in mutual capacitance touch detection performed by the detection apparatus 30. In a display period, the drive IC 19 (refer to FIG. 3) supplies the display drive signals Vcomdc to the second electrodes Tx selected by the drive electrode driver 14.

In an example of the operating method performed by the display apparatus with a detection function 1, the display apparatus with a detection function 1 performs a touch detection operation (detection period) and a display operation (display period) in a time division manner. The touch detection operation and the display operation may be performed in any division manner.

To perform a detection operation using only the first electrodes Rx without using the second electrodes Tx in the detection period, that is, to perform touch detection based on the basic principle of self-capacitance touch detection, for example, the drive electrode driver 14 may supply the detection drive signals Vcom to the first electrodes Rx. While the drive electrode driver 14 according to the present embodiment is disposed in both of the second partial frame region GAb and the fourth partial frame region GAd, it may be disposed in one of the second partial frame region GAb and the fourth partial frame region GAd.

Figure 5:
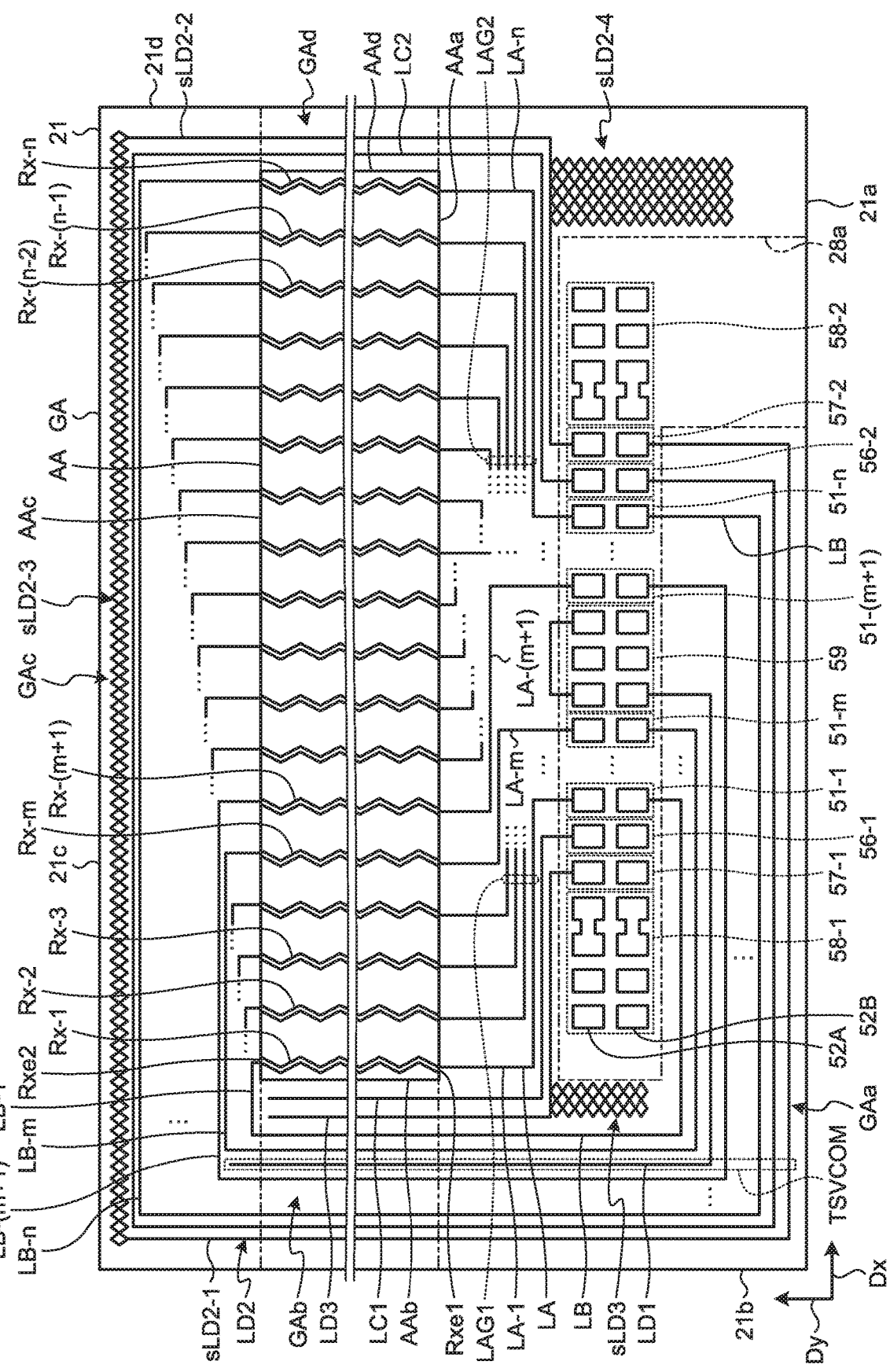
FIG. 5 is a diagram for explaining coupling between first electrodes, first wires, second wires, and terminals according to the first embodiment.
Figure 6:
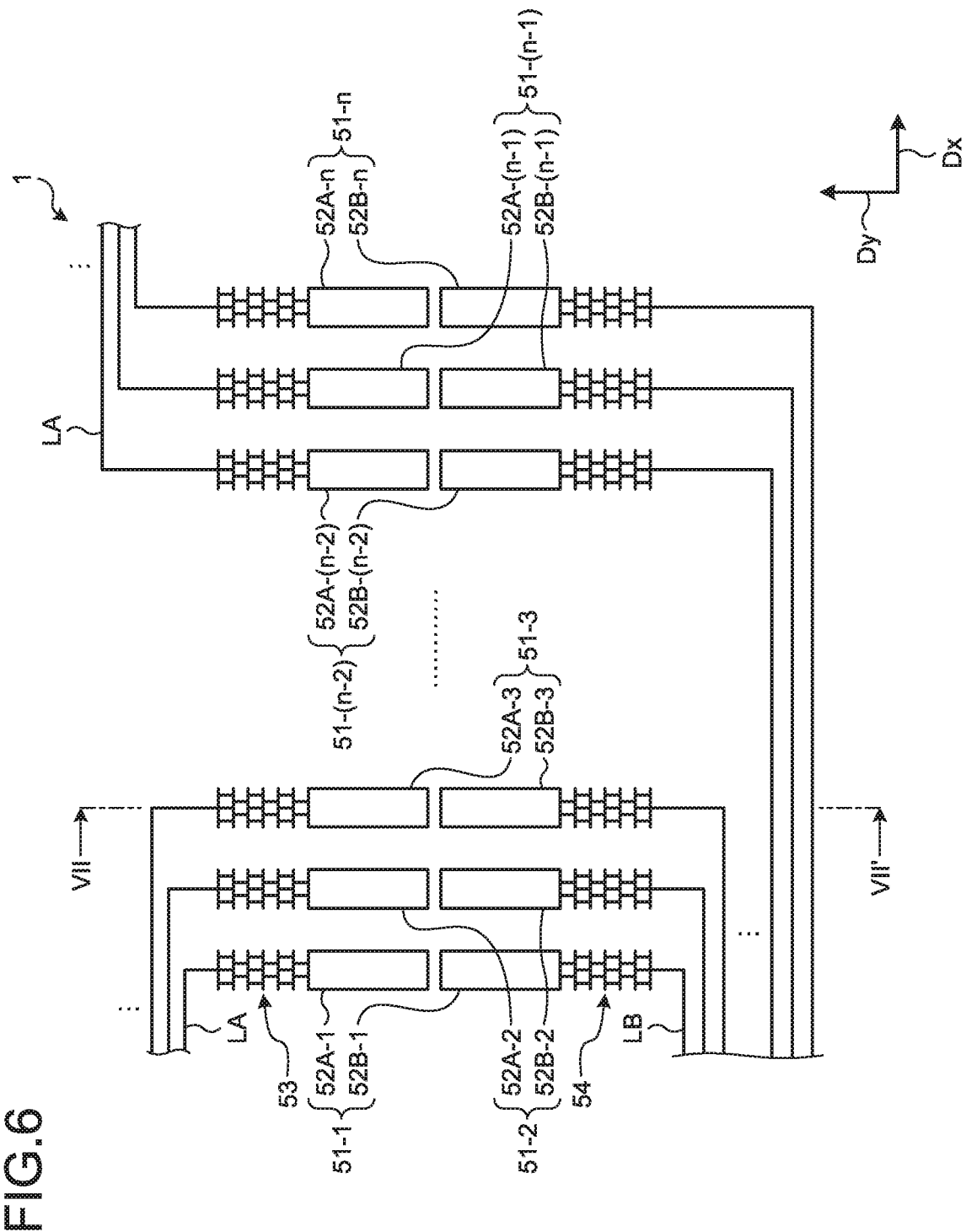
FIG. 6 is a plan view of the terminals according to the first embodiment.
Figure 7:
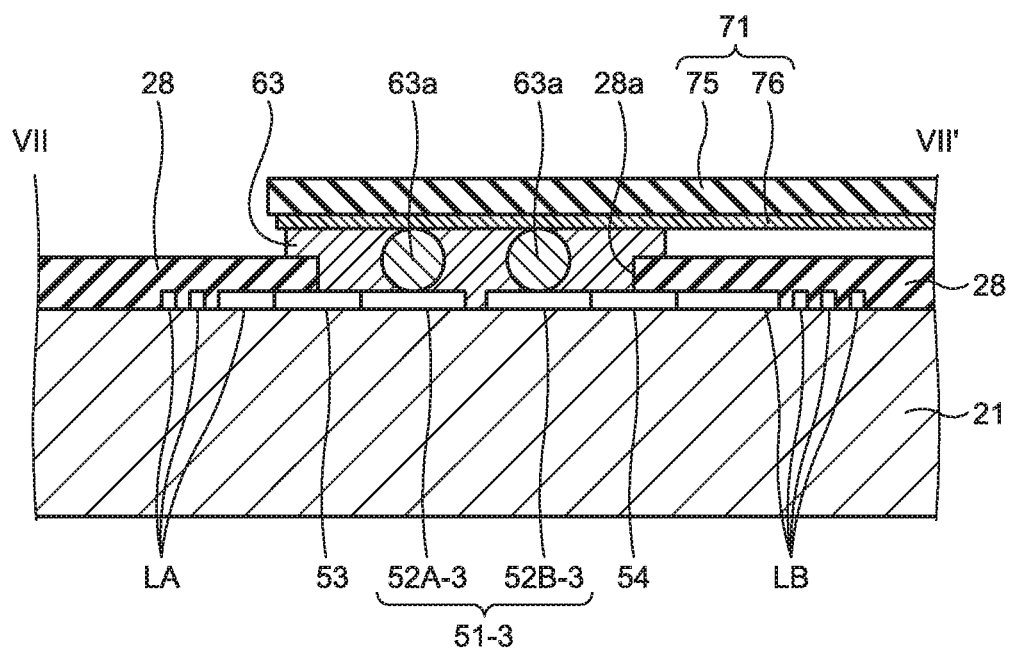
FIG. 7 is a sectional view along line VII-VII' of FIG. 6.

The following describes the coupling configuration of the first electrodes Rx and the wiring substrate 71 according to the present embodiment with reference to FIGS. 5 to 7. FIG. 5 is a diagram for explaining coupling between the first electrodes, the first wires, the second wires, and the terminals according to the first embodiment. FIG. 6 is a plan view of the terminals according to the first embodiment. FIG. 7 is a sectional view along line VII-VII' of FIG. 6.

As illustrated in FIG. 5, the display apparatus with a detection function 1 includes a plurality of terminals 51-1, . . . , 51-$m$, 51-($m$+1), . . . , and 51-$n$, a plurality of first wires LA-1, . . . , LA-m, LA-(m+1), . . . , and LA-n, and a plurality of second wires LB-1, . . . , LB-m, LB-(m+1), . . . , and LB-n. In the following description, the terminals 51-1, . . . , 51-$m$, 51-($m$+1), . . . , and 51-$n$ are referred to as the terminals 51 when they need not be distinguished from one another. Similarly, the first wires LA-1, . . . , LA-m, LA-(m+1), . . . , and LA-n and the second wires LB-1, . . . , LB-m, LB-(m+1), . . . , and LB-n may be referred to as the first wires LA and the second wires LB.

In the example illustrated in FIG. 5, the number of first electrodes Rx is 18, that is, n=18 is satisfied. The number in FIG. 5 is given by way of example only, and n may be 19 or larger or 17 or smaller. In addition, m is a natural number of 2 to n−1. In the example illustrated in FIG. 5, m=5 is satisfied.

The terminals 51 are provided in the first partial frame region GAa and arrayed in the first direction Dx. As illustrated in FIG. 6, the terminals 51 each include a first partial terminal 52A and a second partial terminal 52B. The first partial terminals 52A are arrayed in the first direction Dx. The second partial terminals 52B are also arrayed in the first direction Dx. The first partial terminal 52A and the second partial terminal 52B are separated and disposed side by side in the second direction Dy.

The terminals 51-1, 51-2, 51-3, . . . , 51-(n−2), 51-(n−1), and 51-n are electrically coupled to the first electrodes Rx-1, Rx-2, Rx-3, . . . , Rx-(n−2), Rx-(n−1), and Rx-n illustrated in FIG. 5, respectively. In other words, first partial terminals 52A-1, 52A-2, 52A-3, . . . , 52A-(n−2), 52A-(n−1), and 52A-n are electrically coupled to the first electrodes Rx-1, Rx-2, Rx-3, . . . , Rx-(n−2), Rx-(n−1), and Rx-n, respectively. Second partial terminals 52B-1, 52B-2, 52B-3, . . . , 52B-(n−2), 52B-(n−1), and 52B-n are electrically coupled to the first electrodes Rx-1, Rx-2, Rx-3, . . . , Rx-(n−2), Rx-(n−1), and Rx-n, respectively.

As illustrated in FIG. 6, the first partial terminal 52A is coupled to the first wire LA via a first coupler 53. The second partial terminal 52B is coupled to the second wire LB via a second coupler 54. The first partial terminal 52A and the second partial terminal 52B are provided between the first coupler 53 and the second coupler 54 in the second direction Dy. In other words, the first wire LA is coupled to the end of the first partial terminal 52A at the position away from the second partial terminal 52B. The second wire LB is coupled to the end of the second partial terminal 52B at the position away from the first partial terminal 52A. To simplify the illustration, FIG. 5 does not illustrate the first couplers 53 or the second couplers 54. The first couplers 53 or the second couplers 54 are not necessarily provided. In this case, the first partial terminal 52A may be directly coupled to the first wire LA, and the second partial terminal 52B may be directly coupled to the second wire LB.

As illustrated in FIG. 5, the first wire LA and the second wire LB are coupled to one first electrode Rx. The following describes the first electrode Rx-1, for example. The first wire LA-1 couples the first end Rxe1 of the first electrode Rx-1 and the first partial terminal 52A-1 of the terminal 51-1. The second wire LB-1 couples the second end Rxe2 of the first electrode Rx-1 and the second partial terminal 52B-1 of the terminal 51-1. The first wire LA-1 and the second wire LB-1 are coupled to the single first electrode Rx-1 and the single terminal 51-1. Similarly, the first electrodes Rx-2, . . . , and Rx-n are coupled to the terminals 51-2, . . . , and 51-n, respectively, via the first wires LA and the second wires LB.

The first wires LA are provided in the first partial frame region GAa between the first electrodes Rx and the terminals 51 and arrayed in the first direction Dx. The second wires LB are provided in the third partial frame region GAc, the second partial frame region GAb, and the first partial frame region GAa. The second wires LB are provided in part of the first partial frame region GAa opposite to the part provided with the first wires LA with respect to the terminals 51.

The first wires LA and the second wires LB are made of the same material as the metal material or the alloy material of the first electrodes Rx. The first wires LA and the second wires LB simply need to be made of a highly conductive material and may be made of a material different from that of the first electrodes Rx.

FIG. 7 illustrates the coupling configuration of the terminal 51-3 illustrated in FIG. 6 and the wiring substrate 71. The terminals 51 other than the terminal 51-3 are also coupled to the single wiring substrate 71 similarly to the configuration illustrated in FIG. 7. As illustrated in FIG. 7, the wiring substrate 71 is disposed facing the terminal 51-3. The wiring substrate 71 includes a base 75 and a coupling terminal 76. The coupling terminal 76 is provided on the surface of the base 75 facing the first substrate 21 and is disposed facing the terminal 51-3. The coupling terminal 76 is disposed facing the first partial terminal 52A-3 and the second partial terminal 52B-3.

The first partial terminal 52A-3 and the second partial terminal 52B-3 are electrically coupled to the coupling terminal 76 with a conductive adhesive 63 interposed therebetween. The conductive adhesive 63 is an anisotropic conductive film (ACF), for example. The conductive adhesive 63 includes a number of conductive particles 63a. The conductive particles 63a are spherical particles obtained by covering a metal material with an insulating layer, for example. To simplify the illustration, FIG. 7 illustrates two conductive particles 63a alone.

The protective layer 28 is provided on the first wire LA and the second wire LB and on part of the first coupler 53 and part of the second coupler 54. The first partial terminal 52A-3 and the second partial terminal 52B-3 are disposed between parts of the protective layer 28 facing each other. The conductive adhesive 63 covers the first partial terminal 52A-3 and the second partial terminal 52B-3 and overlaps the ends of the protective layer 28.

The wiring substrate 71 is disposed on the conductive adhesive 63 and then heated and pressurized. At this time, the conductive particles 63a between the coupling terminal 76 and the terminal 51-3 are crushed, whereby the metal material in the conductive particles 63a is exposed from the insulating layer. As a result, the coupling terminal 76 is electrically coupled to the terminal 51-3 via the conductive particles 63a. The conductive adhesive 63 is provided continuously over the terminals 51. However, electrical connection between the conductive particles 63a in an in-plane direction of the second substrate 31 is suppressed because the pressurization is smaller in the in-plane direction than in the vertical direction. As a result, the terminals 51 or the coupling terminals 76 disposed side by side in planar view are not electrically connected, and the terminals 51 and the respective coupling terminals 76 are electrically connected in the vertical direction.

While one terminal 51-3 and one coupling terminal 76 are illustrated in FIG. 7, a plurality of coupling terminals 76 are provided corresponding to the respective terminals 51. The coupling terminals 76 are electrically coupled to the respective terminals 51 in one-to-one correspondence.

With the configuration described above, the first wire LA and the second wire LB are coupled to the single coupling terminal 76 of the wiring substrate 71. As illustrated in FIG. 5, the first wire LA and the second wire LB according to the present embodiment are coupled to one first electrode Rx. If one of the first wire LA and the second wire LB is broken, the other thereof can secure coupling between the first electrode Rx and the wiring substrate 71. Consequently, the display apparatus with a detection function 1 according to the present embodiment can have higher reliability in coupling between the first electrodes Rx and the wiring substrate 71.

The number of first wires LA according to the present embodiment is equal to that of first electrodes Rx, and the number of second wires LB is equal to that of first electrodes Rx. As a result, the number of wires increases compared with a case where the first electrodes Rx are each coupled to the corresponding one wire. In this case, however, the first partial terminal 52A and the second partial terminal 52B are electrically coupled to the single coupling terminal 76. With this configuration, it is not necessary to increase the number of coupling terminals 76 of the wiring substrate 71 or to electrically couple the first wires LA and the second wires LB in the wiring substrate 71. Consequently, the wiring substrate 71 has a simpler configuration, thereby reducing the manufacturing cost.

The first partial terminal 52A is electrically coupled to the first end Rxe1 of one first terminal Rx via the first wire LA, and the second partial terminal 52B is coupled to the second end Rxe2 thereof via the second wire LB. With this configuration, the first partial terminal 52A and the second partial terminal 52B can be used as terminals for an electrical characteristics inspection, such as a resistance inspection, for the first wire LA and the second wire LB. By bringing a probe of a measuring instrument into contact with the first partial terminal 52A and the second partial terminal 52B when the wiring substrate 71 is not coupled thereto, for example, a resistance inspection and a breaking inspection can be performed on the wires.

Figure 8:
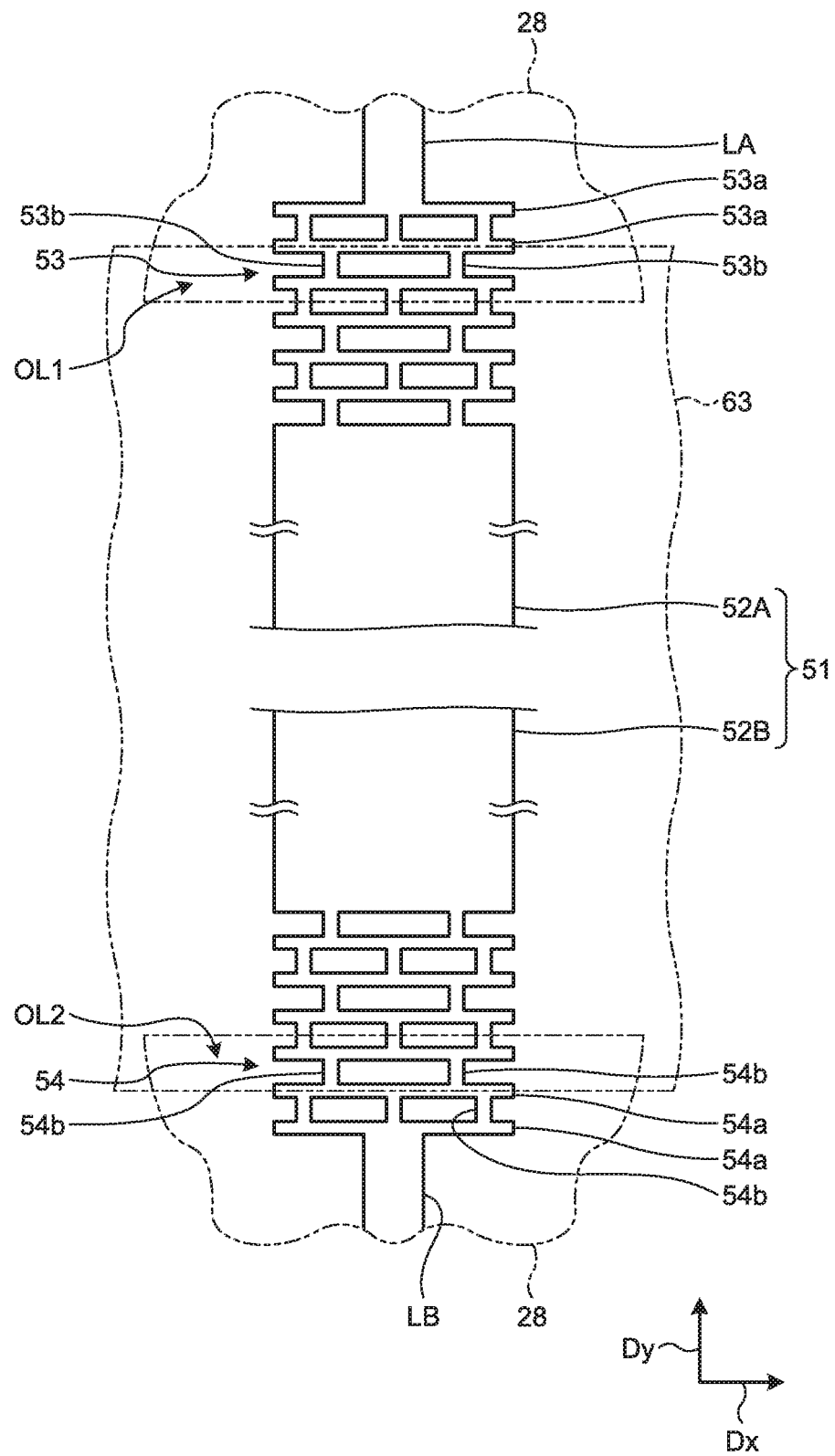
FIG. 8 is an enlarged plan view of the terminal according to the first embodiment.

The following describes the configuration of the first coupler 53 and the second coupler 54 with reference to FIG. 8. FIG. 8 is an enlarged plan view of the terminal according to the first embodiment. As illustrated in FIG. 8, the first coupler 53 has linear parts 53a and coupling parts 53b. The linear parts 53a are provided along the first direction Dx and arrayed in the second direction Dy. In other words, the linear parts 53a extend in a direction along the end of the first partial terminal 52A and are arrayed between the first wire LA and the first partial terminal 52A. The coupling parts 53b each couple the linear parts 53a disposed side by side in the second direction Dy. The coupling parts 53b are arrayed in the first direction Dx. The coupling parts 53b disposed side by side in the second direction Dy are alternately provided such that their positions in the first direction Dx are different. The numbers and the shapes of the linear parts 53a and the coupling parts 53b illustrated in FIG. 8 are given by way of example only and may be appropriately modified.

The second coupler 54 has linear parts 54a and coupling parts 54b. While the second coupler 54 is line-symmetric to the first coupler 53 with respect to a virtual line extending in parallel with the first direction Dx, the structure is not limited thereto. The second coupler 54 and the first coupler 53 may have different shapes. The first coupler 53 and the second coupler 54 may be made of the same metal material as that of the terminal 51.

The protective layer 28 is provided on the surface of the first substrate 21. As illustrated in FIG. 5, the protective layer 28 has an opening 28a at a position overlapping the terminals 51. As illustrated in FIG. 8, the first wire LA and part of the first coupler 53 are covered with the protective layer 28. The second wire LB and part of the second coupler 54 are covered with the protective layer 28. The conductive adhesive 63 is provided covering the terminal 51. The conductive adhesive 63 partially overlaps the protective layer 28 at an overlapping part OL1. The conductive adhesive 63 partially overlaps the protective layer 28 at an overlapping part OL2.

The structure of the first coupler 53 and the second coupler 54 described above increases the contact area of the first coupler 53 and the second coupler 54 with the protective layer 28. This structure can increase the adhesion between the protective layer 28 and the first coupler 53 and between the protective layer 28 and the second coupler 54. If neither the first coupler 53 nor the second coupler 54 is provided, and the protective layer 28 is applied and formed by a printing method, such as an inkjet system, the protective layer 28 may possibly be provided to a position overlapping the terminal 51 because of the fluidity of ink. Specifically, the ink may possibly flow to the terminal 51 because the metal material used for the terminal 51 has high wettability to the resin material used for the ink. The present embodiment includes the first coupler 53 and the second coupler 54, thereby reducing the area of the metal material in contact with the ink when the protective layer 28 is applied and formed. Consequently, the present embodiment can prevent the protective layer 28 from overlapping the terminal 51.

Figure 9:
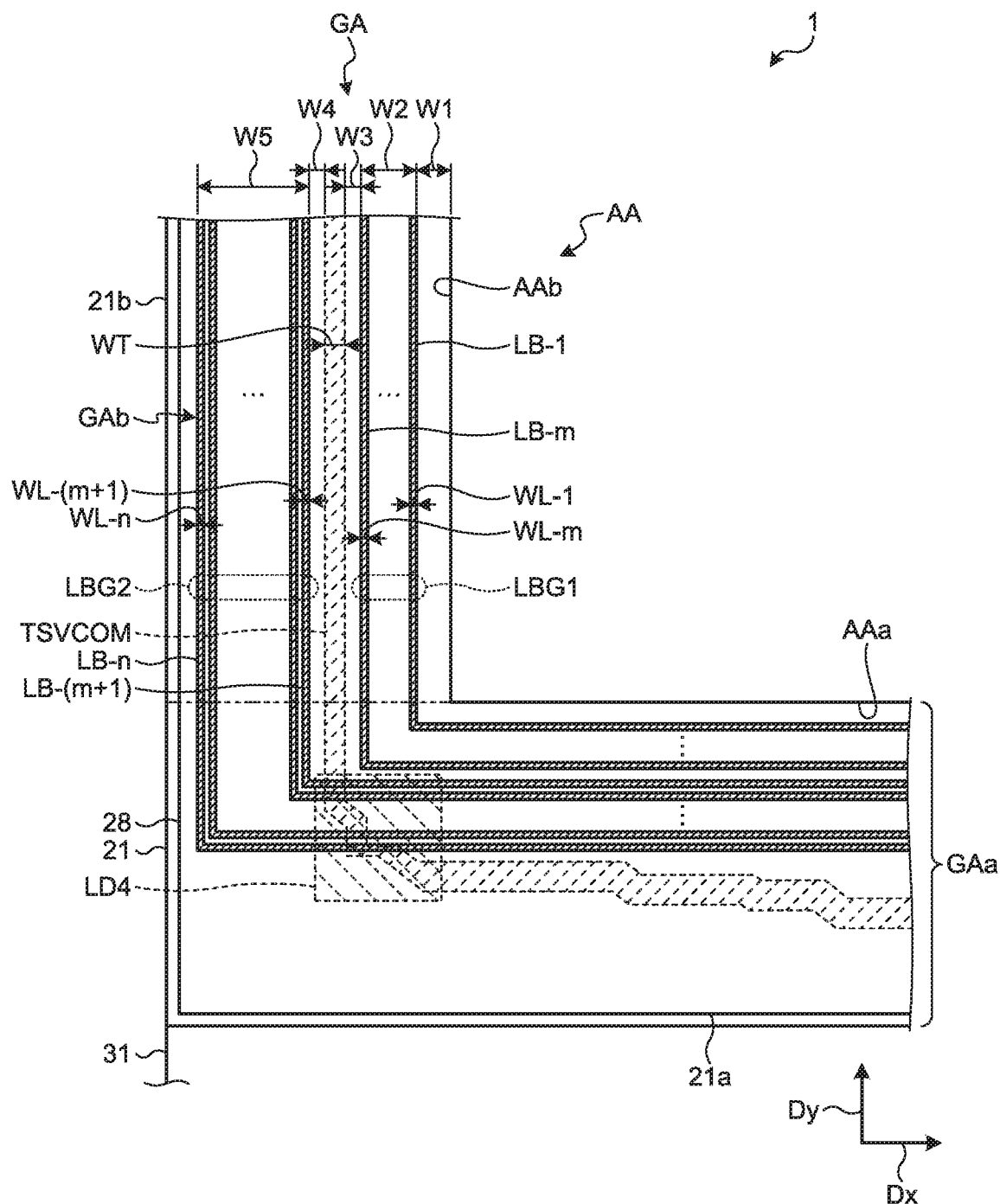
FIG. 9 is a plan view of the relation between the second wires and a drive signal supply line.
Figure 10:
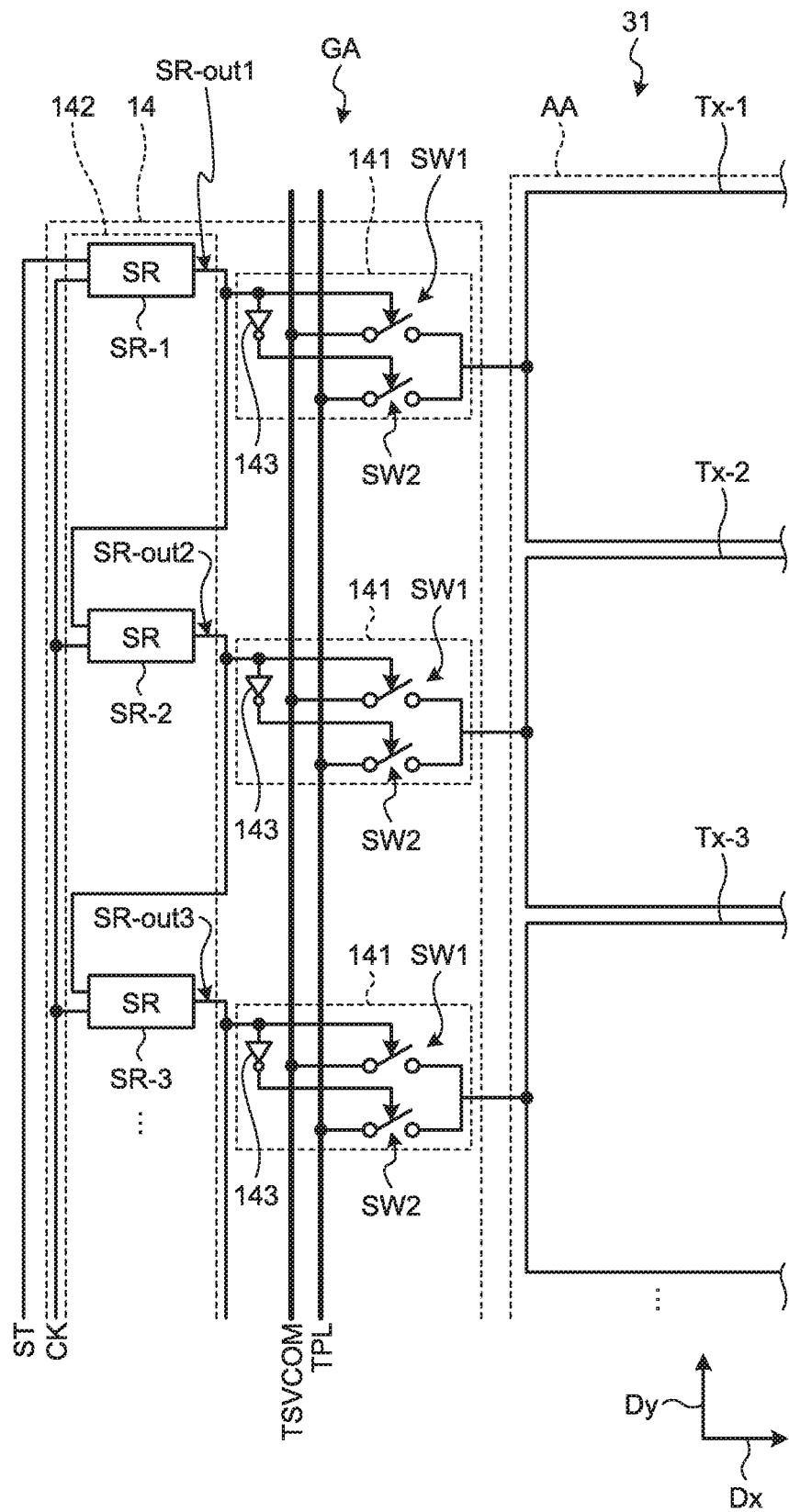
FIG. 10 is a circuit diagram of a drive electrode driver.

The following describes the configuration of the second wires LB in greater detail with reference to FIGS. 5, 9, and 10 and other figures. FIG. 9 is a plan view of the relation between the second wires and a drive signal supply line. FIG. 10 is a circuit diagram of the drive electrode driver.

As illustrated in FIG. 5, a first group LAG1 indicates a plurality of first wires LA extending from their coupling parts with the respective terminals 51 toward the second partial frame region GAb out of the first wires LA. A second group LAG2 indicates a plurality of first wires LA extending from their coupling parts with the respective terminals 51 toward the fourth partial frame region GAd out of the first wires LA. All the second wires LB-1, . . . , and LB-n according to the present embodiment are provided in the second partial frame region GAb and the first partial frame region GAa and coupled to the respective terminals 51.

In the first partial frame region GAa, the position of the second wires LB in the first direction Dx overlaps the position of the first group LAG1 in the first direction Dx. By contrast, no second wire LB is provided at a region overlapping the position of the second group LAG2 in the first direction Dx. With this configuration, breaking of the second wires LB can be suppressed if an external object comes into contact with the part provided with the first group LAG1 in the first partial frame region GAa and breaks the first wires LA. Consequently, the second wire LB secures coupling between the first electrodes Rx and the wiring substrate 71.

The display apparatus with a detection function 1 can have higher reliability in coupling between the first electrodes Rx and the wiring substrate 71.

The length of the first wire LA is different from that of the second wire LB. As a result, the resistance of the first wire LA is different from that of the second wire LB. The resistance of the first wire LA according to the present embodiment is smaller than that of the second wire LB. The resistance of the first wire LA is substantially 800Ω to 1200Ω, for example. The resistance of the second wire LB is substantially 3000Ω to 6000Ω, for example. In other words, the ratio between the resistance of the first wire LA and that of the second wire LB is equal to or larger than 0.13. The ratio between the resistance of the first wire LA and that of the second wire LB is equal to or smaller than 0.4. The first wire LA and the second wire LB have the same width, for example. By making the width of the second wire LB larger than that of the first wire LA, the ratio between the resistance of the first wire LA and that of the second wire LB may be made closer to 1.

As illustrated in FIG. 5, the first partial frame region GAa is provided with first shield terminals 56-1 and 56-2, second shield terminals 57-1 and 57-2, a third shield terminal 59, and dummy terminals 58-1 and 58-2. The first shield terminals 56-1 and 56-2, the second shield terminals 57-1 and 57-2, the third shield terminal 59, and the dummy terminals 58-1 and 58-2 are disposed side by side with the terminals 51 in the first direction Dx. Specifically, the terminals 51, the first shield terminals 56-1 and 56-2, the second shield terminals 57-1 and 57-2, and the third shield terminal 59 are disposed between the dummy terminals 58-1 and 58-2. The terminals are disposed in the first direction Dx in the following order: the second shield terminal 57-1, the first shield terminal 56-1, the terminals 51-1, . . . , and 51-$m$, the third shield terminal 59, the terminals 51-($m$+1), . . . , and 51-$n$, the first shield terminal 56-2, and the second shield terminal 57-2. First shield terminals 56, second shield terminals 57, and the third shield terminal 59 are fixed potential supply terminals coupled to fixed potential supply wires. The fixed potential supply wires are supplied with a predetermined potential and include shield wires, for example.

Neither the dummy terminal 58-1 nor 58-2 is coupled to the electrodes and the wires in the detection region AA. With the dummy terminals 58-1 and 58-2, an inspection for coupling resistance between the terminals and the coupling terminal 76 (refer to FIG. 7) of the wiring substrate 71 can be performed.

The first shield terminal 56-1 is coupled to a first guard wire LC1. The second shield terminal 57-1 is coupled to a third shield wire LD3. The first guard wire LC1 and the third shield wire LD3 are provided in the second partial frame region GAb and extend in the second direction Dy. The first guard wire LC1 and the third shield wire LD3 are provided between the first electrode Rx-1 and the second wire LB-1 in the first direction Dx. The third shield wire LD3 is coupled to a fifth partial shield wire sLD3. The fifth partial shield wire sLD3 consists of a plurality of metal wires having a mesh shape. The fifth partial shield wire sLD3 is provided in the first partial frame region GAa between the dummy terminal 58-1 and the second wire LB-1 in the first direction Dx.

A first electrode Rx-(m+1) (third electrode) is provided at a position overlapping the detection region AA of the first substrate 21 and extends in the second direction Dy. The terminals 51 include a terminal 51-($m$+1) (second terminal). A first wire LA-($m$+1) (third wire) couples the first end Rxe1 in the second direction Dy of the first electrode Rx-($m$+1) (third electrode) and the terminal 51-($m$+1) (second terminal). A second wire LB-(m+1) (fourth wire) couples the second end Rxe2 opposite to the first end Rxe1 of the first electrode Rx-(m+1) (third electrode) and the terminal 51-(m+1) (second terminal). The third shield terminal 59 is coupled to a first shield wire LD1. The first shield wire LD1 is provided in the second partial frame region GAb and extends in the second direction Dy. The first shield wire LD1 is provided at a position overlapping a drive signal supply line TSVCOM between the second wires LB-m and LB-(m+1) (fourth wire) disposed side by side in the first direction Dx. The drive signal supply line TSVCOM is provided in the second partial frame region GAb of the second substrate 31 and extends in the second direction Dy. The drive signal supply line TSVCOM is a wire that supplies the drive signals Vcom to the second electrodes Tx.

The first shield terminal 56-2 is coupled to a second guard wire LC2. One end of the second guard wire LC2 is coupled to the first partial terminal 52A, and the other end thereof is coupled to the second partial terminal 52B. The second guard wire LC2 has a loop shape surrounding the detection region AA. The second guard wire LC2 is provided surrounding the first wires LA and the second wires LB.

The second shield terminal 57-2 is coupled to a second shield wire LD2. The second shield wire LD2 includes a first partial shield wire sLD2-1, a second partial shield wire sLD2-2, and a third partial shield wire sLD2-3. The first partial shield wire sLD2-1 is coupled to the second partial terminal 52B and provided in the second partial frame region GAb and extends in the second direction Dy. The second partial shield wire sLD2-2 is coupled to the first partial terminal 52A and provided in the fourth partial frame region GAd and extends in the second direction Dy. The third partial shield wire sLD2-3 is provided in the third partial frame region GAc and extends in the first direction Dx. The third partial shield wire sLD2-3 consists of a plurality of metal wires having a mesh shape.

One end of the third partial shield wire sLD2-3 is coupled to the first partial shield wire sLD2-1, and the other end thereof is coupled to the second partial shield wire sLD2-2. As a result, the first partial shield wire sLD2-1, the third partial shield wire sLD2-3, and the second partial shield wire sLD2-2 are coupled in a loop shape. The region surrounded by the second shield wire LD2 is provided with the first guard wire LC1, the second guard wire LC2, the first shield wire LD1, the third shield wire LD3, the first wires LA, and the second wires LB.

The second partial shield wire sLD2-2 is coupled to a fourth partial shield wire sLD2-4. The fourth partial shield wire sLD2-4 consists of a plurality of metal wires having a mesh shape. The fourth partial shield wire sLD2-4 is provided in the first partial frame region GAa and disposed side by side with the dummy terminal 58-2 in the first direction Dx.

To perform touch detection, the detection IC 201 (refer to FIG. 2) supplies DC voltage signals having a predetermined potential to the first electrodes Rx. The predetermined potential is a reference potential of the first electrodes Rx. The first shield wire LD1, the second shield wire LD2 and the fourth partial shield wire sLD2-4, and the third shield wire LD3 and the fifth partial shield wire sLD3 are the fixed potential supply wires. The detection IC 201 supplies, to the shield wires, signals having the same electric potential as that of the DC voltage signals supplied to the first electrodes Rx or the reference potential or a ground potential.

The first guard wire LC1 and the second guard wire LC2 are active guard wires supplied with signals having the same amplitude as that of the drive signals Vcom supplied to the second electrodes Tx by the detection IC 201. When the drive signals Vcom are supplied to the second electrode Tx, the electric potential of the first electrodes Rx also changes at the same amplitude as that of the drive signals Vcom based on the capacitance between the first electrodes Rx and the second electrodes Tx. By contrast, the electric potential of the fixed potential supply wires, such as the first shield wire LD1, the second shield wire LD2 and the fourth partial shield wire sLD2-4, and the third shield wire LD3 and the fifth partial shield wire sLD3, is fixed to the predetermined potential. As a result, the capacitance between the first electrodes Rx and the fixed potential supply wires may possibly serve as noise. To address this, the active guard wires are disposed between the fixed potential supply wires and the first electrodes Rx, thereby suppressing noise. To perform self-capacitance touch detection with the first electrodes Rx, the detection IC 201 (refer to FIG. 2) supplies drive signals serving as AC voltage signals to the first electrodes Rx. The capacitance in the first electrodes Rx is changed by contact or proximity of a finger or the like. The signals corresponding to the capacitance changes in the first electrodes Rx are output to the detection IC 201. At this time, the detection IC 201 supplies AC voltage signals having the same electric potential as that of the drive signals supplied to the first electrodes Rx to the first guard wire LC1 and the second guard wire LC2.

Consequently, the display apparatus with a detection function 1 can suppress stray capacitance between the first electrodes Rx and the first wires LA and between the first electrodes Rx and the second wires LB.

As illustrated in FIG. 9, the second wires LB are provided not overlapping the drive signal supply line TSVCOM in the second partial frame region GAb in planar view. FIG. 9 does not illustrate the first guard wire LC1, the second guard wire LC2, the first shield wire LD1 (refer to FIG. 5), or the like. A first group LBG1 indicates the second wires LB-1, . . . , and LB-m out of the second wires LB. A second group LBG2 indicates the second wires LB-(m+1), . . . , and LB-n out of the second wires LB. The first group LBG1 is provided between the second detection side AAb and the drive signal supply line TSVCOM in the second partial frame region GAb in planar view. The first group LBG1 is provided between the first detection side AAa and the drive signal supply line TSVCOM in the first partial frame region GAa in planar view.

The second group LBG2 is provided at a position farther away from the second detection side AAb than the drive signal supply line TSVCOM in the second partial frame region GAb in planar view. The second group LBG2 intersects the drive signal supply line TSVCOM and extends in the first direction Dx in the first partial frame region GAa in planar view and is provided between the first group LBG1 and the drive signal supply line TSVCOM. The second group LBG2 preferably intersects the drive signal supply line TSVCOM at right angles. This configuration can reduce the area of the part where the second wires LB of the second group LBG2 overlap the drive signal supply line TSVCOM. The first electrode Rx-n (third electrode) illustrated in FIG. 5 is provided at a position overlapping the detection region AA of the first substrate 21 and extends in the second direction Dy. The terminals 51 include the terminal 51-n (second terminal). The first wire LA-n (third wire) couples the first end Rxe1 in the second direction Dy of the first electrode Rx-n (third electrode) and the terminal 51-n (second terminal). The second wire LB-n (fourth terminal) couples the second end Rxe2 opposite to the first end Rxe1 of the first electrode Rx-n (third electrode) and the terminal 51-n (second terminal). The second wire LB-1 is provided between the second detection side AAb and the drive signal supply line TSVCOM in the second partial frame region GAb in planar view. The second wire LB-n (fourth wire) is provided at a position farther away from the second detection side AAb than the drive signal supply line TSVCOM in the second partial frame region GAb in planar view.

A fourth shield wire LD4 is provided at the region where the second group LBG2 overlaps the drive signal supply line TSVCOM. The fourth shield wire LD4 is disposed between the second group LBG2 and the drive signal supply line TSVCOM in the direction perpendicular to the first substrate 21. The fourth shield wire LD4 consists of a plurality of metal wires having a mesh shape, for example. This configuration can suppress stray capacitance between the drive signal supply line TSVCOM and the second wires LB. The fourth shield wire LD4 may be made of a translucent conductive material, such as ITO. More specifically, the fourth shield wire LD4 may be made of the same conductive layer as that of the pixel electrodes 32 or the second electrodes Tx provided on the first substrate 21. The fourth shield wire LD4 does not necessarily have a mesh shape and may have a rectangular, polygonal, or circular shape.

The widths of the second wires LB-1, . . . , LB-m, LB-(m+1), . . . , and LB-n are denoted by wire widths WL-1, . . . , WL-m, WL-(m+1), . . . , and WL-n, respectively. The wire widths WL-1, . . . , WL-m, WL-(m+1), . . . , and WL-n according to the present embodiment are equal to one another. The wire widths WL-1, . . . , WL-m, WL-(m+1), . . . , and WL-n are smaller than a wire width WT of the drive signal supply line TSVCOM. The wire widths WL-1, . . . , WL-m, WL-(m+1), . . . , and WL-n may be different from one another. The wire widths WL-(m+1), . . . , and WL-n of the second group LBG2, for example, may be larger than the wire widths WL-1, . . . , and WL-m of the first group LBG1. This structure can reduce the resistance of the second wires LB of the second group LBG2.

A first width W1 is the length between the second wire LB-1 and the second detection side AAb in the first direction Dx. A second width W2 is the length of the second wires LB of the first group LBG1 in the first direction Dx. A third width W3 is the length between the second wire LB-m and the drive signal supply line TSVCOM in the first direction Dx. A fourth width W4 is the length between the drive signal supply line TSVCOM and the second wire LB-(m+1) in the first direction Dx. A fifth width W5 is the length of the second wires LB of the second group LBG2 in the first direction Dx. The second width W2 is smaller than the fifth width W5. The second width W2 is larger than the first width W1 and the third width W3. The third width W3 is equal to the fourth width W4. The fifth width W5 is larger than the fourth width W4. The first width W1 to the fifth width W5 may be appropriately modified.

As illustrated in FIG. 10, the drive signal supply line TSVCOM is provided in the frame region GA of the second substrate 31. The drive signal supply line TSVCOM extends in the second direction Dy. One end of the drive signal supply line TSVCOM is coupled to the drive IC 19 (refer to FIG. 2), and the other end thereof is coupled to the drive electrode driver 14. The drive signal supply line TSVCOM is electrically coupled to second electrodes Tx-1, Tx-2, Tx-3, . . . via the drive electrode driver 14. The drive signal supply line TSVCOM outputs the drive signals Vcom to the second electrodes Tx.

A voltage signal supply line TPL extends along the drive signal supply line TSVCOM. The voltage signal supply line TPL outputs voltage signals having a predetermined fixed potential to non-selected second electrodes Tx via the drive electrode driver 14. The electric potential of the signals supplied by the voltage signal supply line TPL is the ground potential or the same electric potential as that of the display drive signals Vcomdc, for example.

The drive electrode driver 14 includes a plurality of coupling switching circuits 141 and a shift register 142. The coupling switching circuits 141 are provided corresponding to the respective second electrodes Tx-1, Tx-2, Tx-3, . . . . The shift register 142 includes a plurality of shift signal output circuits SR-1, SR-2, SR-3, . . . . The shift signal output circuits SR-1, SR-2, SR-3, . . . are provided corresponding to the respective coupling switching circuits 141.

The shift register 142 starts to operate based on a start signal ST. The shift signal output circuits SR-1, SR-2, SR-3, . . . sequentially output, based on a clock signal CK, output signals SR-out1, SR-out2, SR-out3, . . . to the respective coupling switching circuits 141.

The coupling switching circuits 141 each include a first switch SW1 and a second switch SW2. The first switch SW1 turns on and off the coupling relation between the second electrode Tx and the drive signal supply line TSVCOM. The second switch SW2 turns on and off the coupling relation between the second electrode Tx and the voltage signal supply line TPL.

The first switch SW1 operates based on the output signal SR-out. The second switch SW2 operates based on a voltage signal obtained by inverting the polarity of the output signal SR-out by an inverter 143. In other words, the first switch SW1 is turned on when the second switch SW2 is turned off. The first switch SW1 is turned off when the second switch SW2 is turned on.

In the coupling switching circuit 141 supplied with the output signal SR-out from the shift register 142, the first switch SW1 is turned on, and the second electrode Tx is selected. The selected second electrode Tx is coupled to the drive signal supply line TSVCOM via the first switch SW1 and supplied with the drive signal Vcom from the drive signal supply line TSVCOM. In the coupling switching circuit 141 not supplied with the output signal SR-out, the second switch SW2 is turned on, and the second electrode Tx is not selected. The non-selected second electrode Tx is supplied with a voltage signal having the fixed potential via the voltage signal supply line TPL. The shift register 142 sequentially outputs the output signals SR-out1, SR-out2, SR-out3, . . . , thereby sequentially selecting the second electrodes Tx-1, Tx-2, Tx-3, . . . .

A plurality of second electrodes Tx may be coupled to one coupling switching circuit 141. In this case, the drive signals Vcom are supplied in units of a second electrode block including a plurality of second electrodes Tx. The drive electrode driver 14 illustrated in FIG. 10 is given by way of example only, and the circuit configuration may be appropriately modified to a decoder circuit, for example.

First Modification of the First Embodiment

Figure 11:
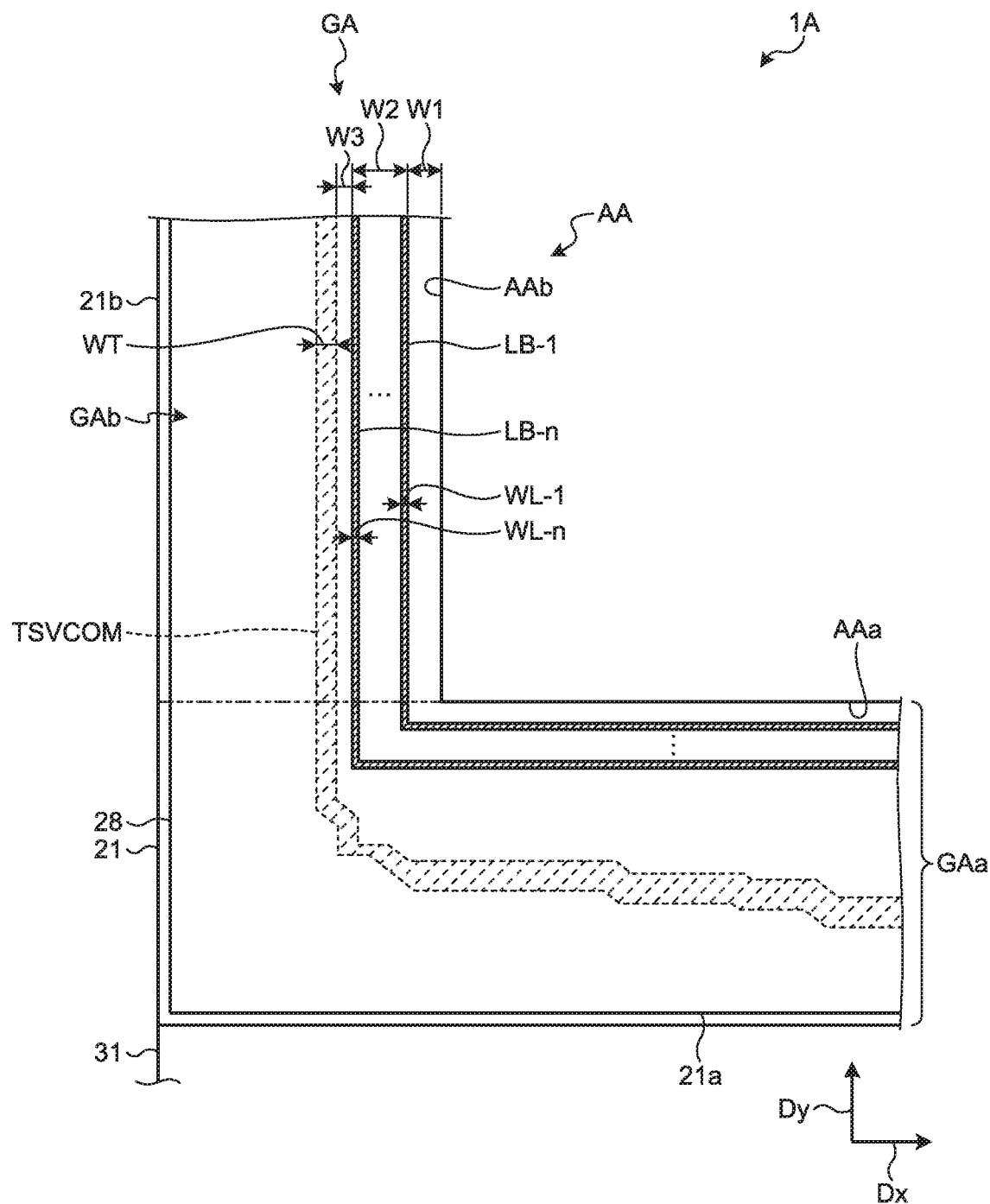
FIG. 11 is a plan view of the relation between the second wires and the drive signal supply line according to a first modification of the first embodiment.

FIG. 11 is a plan view of the relation between the second wires and the drive signal supply line according to a first modification of the first embodiment. As illustrated in FIG. 11, in a display apparatus with a detection function 1A according to the present modification, all the second wires LB-1, . . . , and LB-n are provided between the second detection side AAb and the drive signal supply line TSVCOM in the second partial frame region GAb. In other words, the second wires LB are not provided in a region overlapping the drive signal supply line TSVCOM nor between the drive signal supply line TSVCOM and the second substrate side 21b in the second partial frame region GAb. All the second wires LB-1, . . . , and LB-n are provided between the first detection side AAa and the drive signal supply line TSVCOM in the first partial frame region GAa.

With this configuration, all the second wires LB are provided in a region not overlapping the drive signal supply line TSVCOM. Consequently, the display apparatus with a detection function 1A can suppress stray capacitance between the second wires LB and the drive signal supply line TSVCOM.

Second Modification of the First Embodiment

Figure 12:
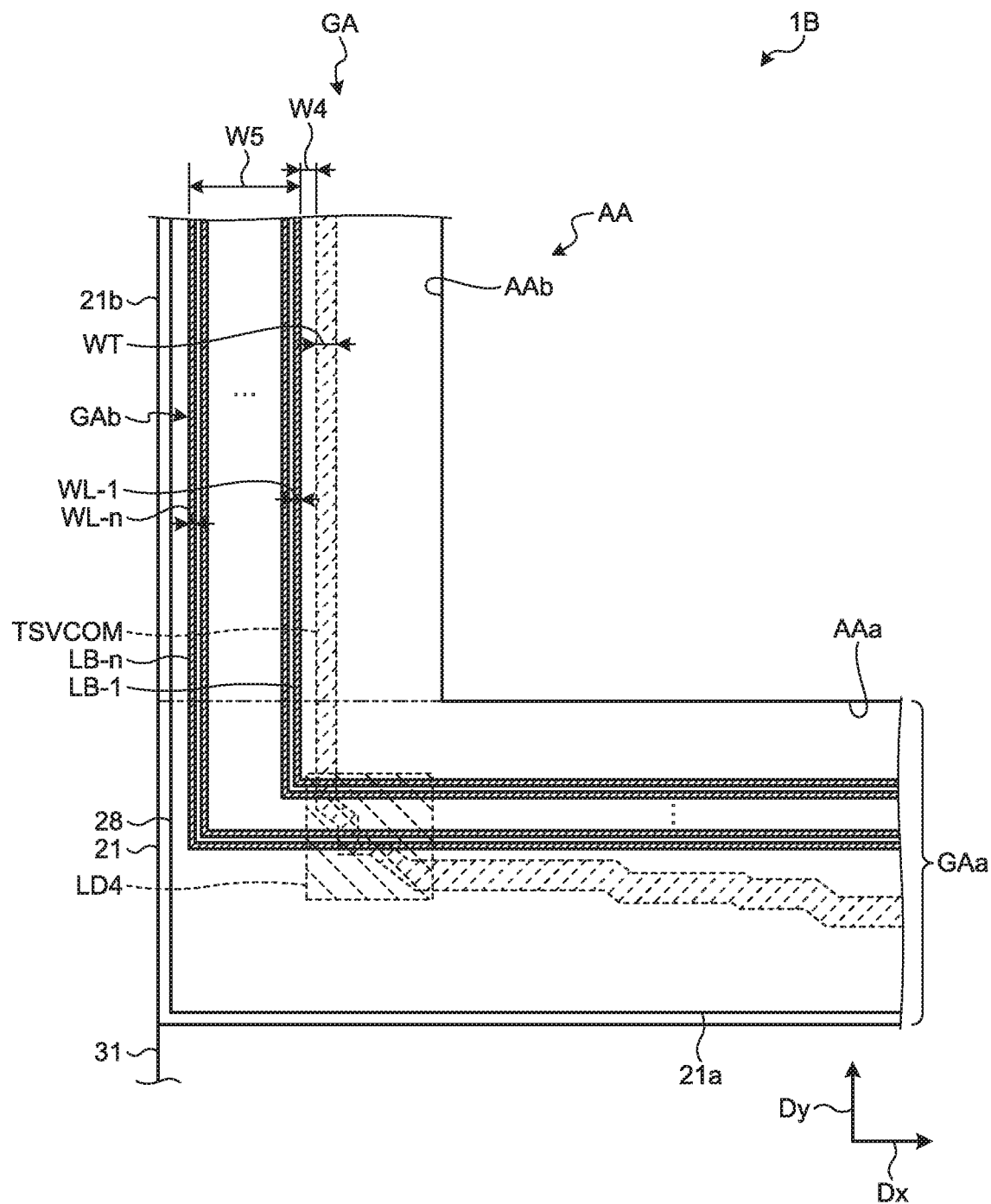
FIG. 12 is a plan view of the relation between the second wires and the drive signal supply line according to a second modification of the first embodiment.

FIG. 12 is a plan view of the relation between the second wires and the drive signal supply line according to a second modification of the first embodiment. As illustrated in FIG. 12, in a display apparatus with a detection function 1B according to the present modification, all the second wires LB-1, . . . , and LB-n are provided at a position farther away from the second detection side AAb than the drive signal supply line TSVCOM in the second partial frame region GAb. In other words, the second wires LB are provided between the drive signal supply line TSVCOM and the second substrate side 21b in the second partial frame region GAb. The second wires LB intersect the drive signal supply line TSVCOM, extend in the first direction Dx, and are coupled to the respective terminals 51 in the first partial frame region GAa. The second wires LB are provided between the drive signal supply line TSVCOM and the first detection side AAa in the first partial frame region GAa.

With this configuration, the second wires LB are provided at a position not overlapping the drive electrode driver 14 (refer to FIG. 10). This configuration can suppress fluctuations in the electric potential of the second wires LB caused by the output signal SR-out and the drive signals Vcom output from the drive electrode driver 14.

Third Modification of the First Embodiment

Figure 13:
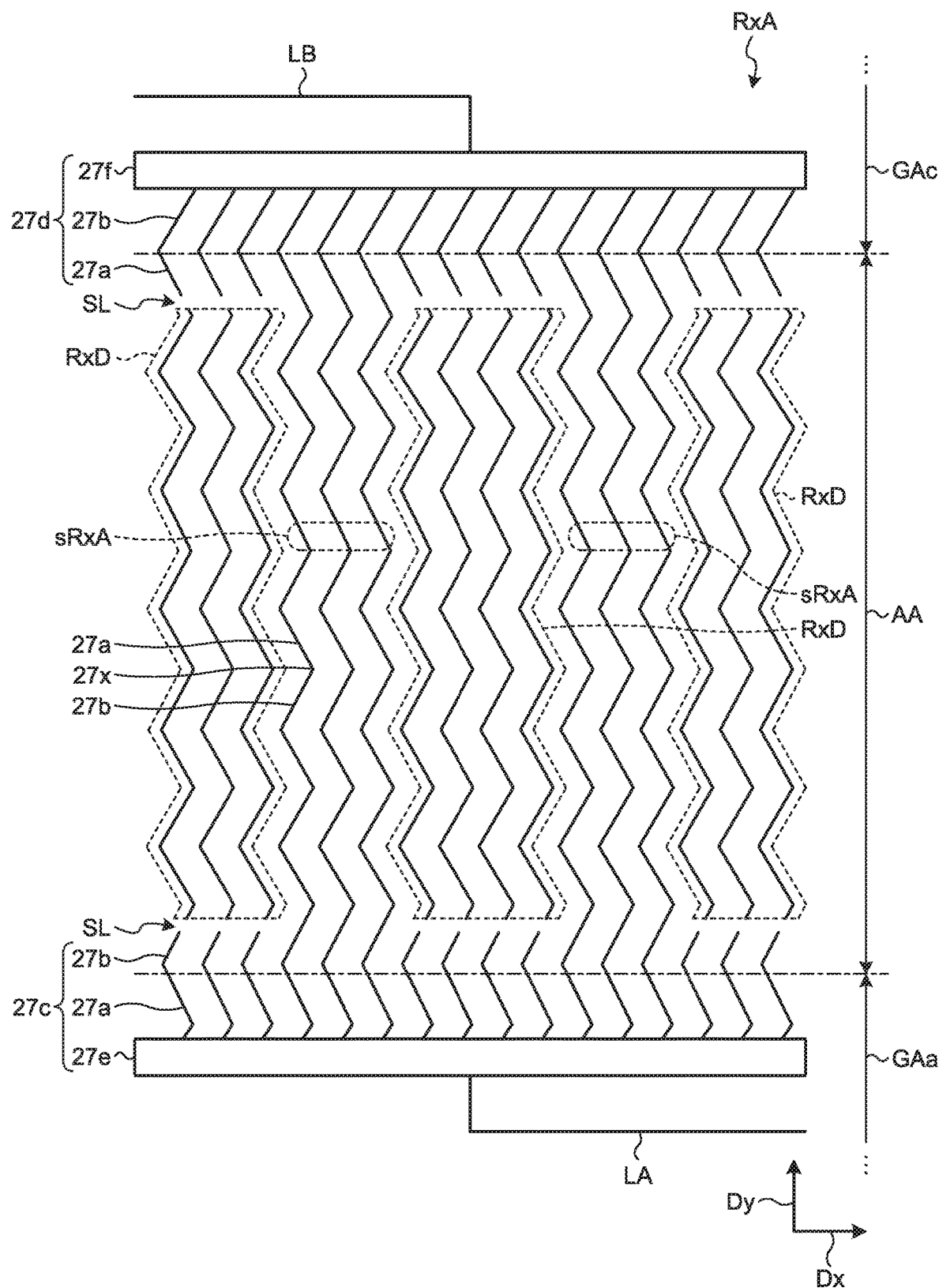
FIG. 13 is an enlarged plan view of the first electrode according to a third modification of the first embodiment.

FIG. 13 is an enlarged plan view of the first electrode according to a third modification of the first embodiment. FIG. 13 illustrates a first electrode RxA. As illustrated in FIG. 13, the first electrode RxA according to the present modification includes a plurality of dummy electrodes RxD, a plurality of partial electrodes sRxA, a first partial electrode coupler 27c, and a second partial electrode coupler 27d.

The partial electrodes sRxA and the dummy electrodes RxD each include a plurality of wires extending in the second direction Dy. The wires have a zigzag shape in which the first thin wires 27a and the second thin wires 27b are coupled by the bends 27x. The partial electrodes sRxA and the dummy electrodes RxD extend in the second direction Dy and are alternately arrayed in the first direction Dx. The wires in the partial electrodes sRxA and the dummy electrodes RxD may have another shape, such as a wavy, linear, or mesh shape.

The first partial electrode coupler 27c includes the first thin wires 27a, the second thin wires 27b, and a first coupling wire 27e. The first partial electrode coupler 27c is provided in the first partial frame region GAa and couples the ends of the partial electrodes sRxA. The dummy electrodes RxD are electrically separated from the first partial electrode coupler 27c and the partial electrodes sRxA by slits SL formed in the second thin wires 27b.

The second partial electrode coupler 27d includes the first thin wires 27a, the second thin wires 27b, and a second coupling wire 27f. The second partial electrode coupler 27d is provided in the third partial frame region GAc and couples the ends of the partial electrodes sRxA. The dummy electrodes RxD are electrically separated from the second partial electrode coupler 27d and the partial electrodes sRxA by the slits SL formed in the first thin wires 27a. Part of the first thin wires 27a and the second thin wires 27b having the slits SL are disposed in the detection region AA.

As described above, a plurality of partial electrodes sRxA are electrically coupled by the first partial electrode coupler 27c and the second partial electrode coupler 27d to serve as one first electrode RxA. The dummy electrodes RxD are electrically separated from the first partial electrode coupler 27c, the second partial electrode coupler 27d, and the partial electrodes sRxA and do not serve as detection electrodes. The use of the dummy electrodes RxD can reduce the difference in light transmittance between the region provided with the partial electrodes sRxA and the region not provided with the partial electrodes sRxA. Similarly to the example described above, the first coupling wire 27e of the first partial electrode coupler 27c is coupled to the first wire LA. The second coupling wire 27f of the second partial electrode coupler 27d is coupled to the second wire LB.

The configuration illustrated in FIG. 13 is given by way of example only, and one first electrode RxA may include three or more partial electrodes sRxA. The number of wires included in the partial electrode sRxA and the dummy electrode RxD may be appropriately modified.

Second Embodiment

Figure 14:
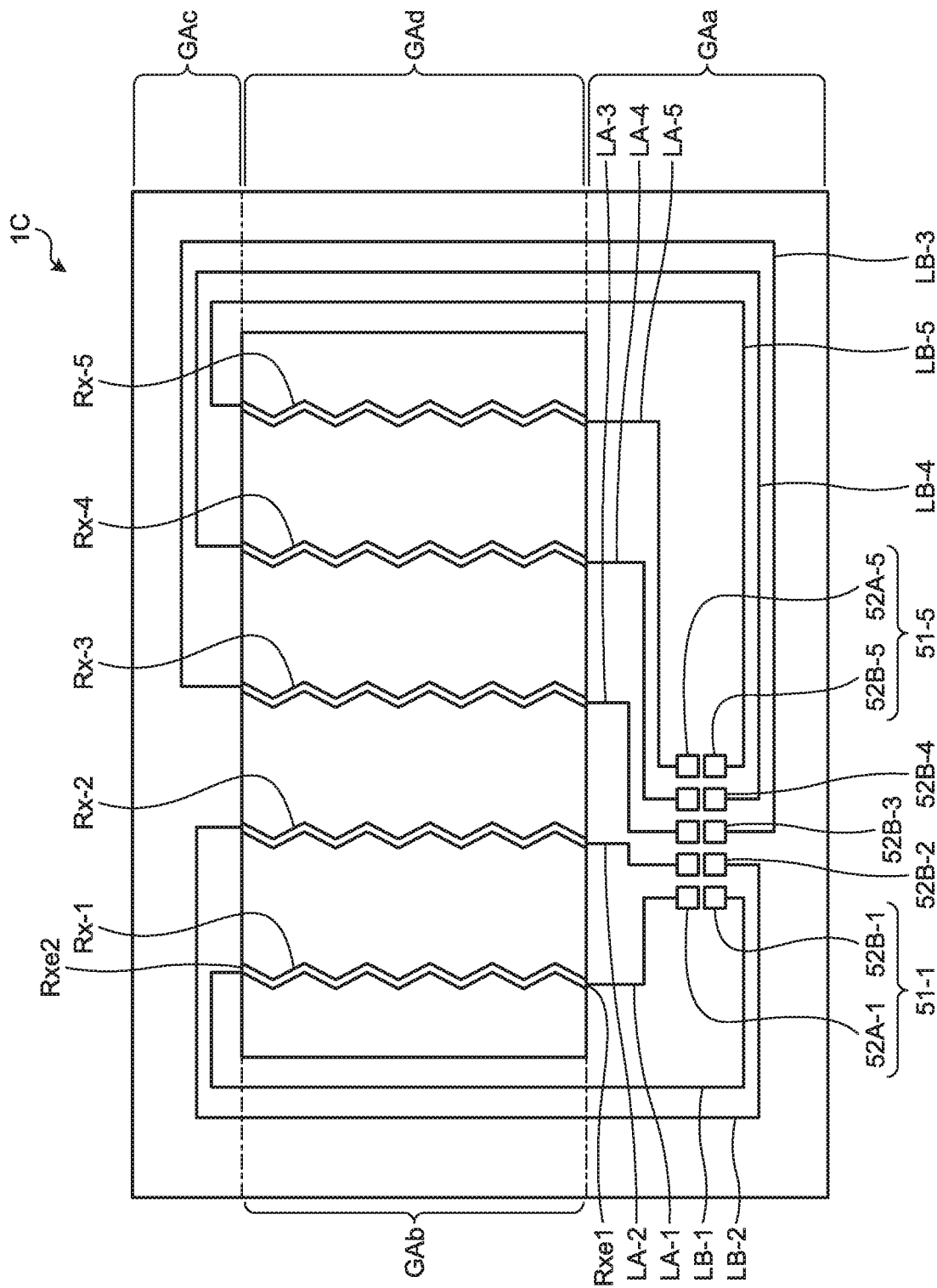
FIG. 14 is a diagram for explaining coupling between the first electrodes, the first wires, the second wires, and the terminals according to a second embodiment of the present disclosure.

FIG. 14 is a diagram for explaining coupling between the first electrodes, the first wires, the second wires, and the terminals according to a second embodiment of the present disclosure. To simplify the explanation, FIG. 14 illustrates the coupling relation between five first electrodes Rx-1, Rx-2, Rx-3, Rx-4, and Rx-5 and five terminals 51-1, ..., and 51-5.

The first wires LA-1, LA-2, LA-3, LA-4, and LA-5 are provided in the first partial frame region GAa. The first wires LA-1, ..., and LA-5 couple the first ends Rxe1 of the first electrodes Rx-1, ..., and Rx-5 and the first partial terminals 52A-1, ..., and 52A-5, respectively.

The second wires LB-1 and LB-2 out of the second wires LB are provided in the first partial frame region GAa, the second partial frame region GAb, and the third partial frame region GAc. The second wires LB-1 and LB-2 couple the second ends Rxe2 of the first electrodes Rx-1 and Rx-2 and the second partial terminals 52B-1 and 52B-2, respectively.

The second wires LB-3, LB-4, and LB-5 out of the second wires LB are provided in the first partial frame region GAa, the fourth partial frame region GAd, and the third partial frame region GAc. The second wires LB-3, LB-4, and LB-5 couple the second ends Rxe2 of the first electrodes Rx-3, Rx-4, and Rx-5 and the second partial terminals 52B-3, 52B-4, and 52B-5, respectively. The first electrode Rx-5 (third electrode) illustrated in FIG. 14 is provided at a position overlapping the detection region AA of the first substrate 21 and extends in the second direction Dy. The terminals 51 include the terminal 51-5 (second terminal). The first wire LA-5 (third wire) couples the first end Rxe1 in the second direction Dy of the first electrode Rx-5 (third terminal) and the terminal 51-5 (second terminal). The second wire LB-5 (fourth wire) couples the second end Rxe2 opposite to the first end Rxe1 of the first electrode Rx-5 (third electrode) and the terminal 51-5 (second terminal). The second wire LB-5 (fourth wire) provides in a fourth partial frame region (fourth frame region) opposite to the first partial frame region GAa (first frame region) in the first direction Dx.

This configuration can reduce the difference between the number of second wires LB provided in the second partial frame region GAb and that of second wires LB provided in the fourth partial frame region GAd. Consequently, a display apparatus with a detection function IC can make the second partial frame region GAb narrower than that of the first embodiment.

The number of second wires LB provided in the second partial frame region GAb may be equal to that of second wires LB provided in the fourth partial frame region GAd. Alternatively, the number of second wires LB provided in the second partial frame region GAb may be larger than that of second wires LB provided in the fourth partial frame region GAd. If the drive electrode driver 14 including the drive signal supply line TSVCOM is disposed in only one of the second partial frame region GAb and the fourth partial frame region GAd, the number of second wires LB disposed in the other of the second partial frame region GAb and the fourth partial frame region GAd may be made larger.

If the drive electrode driver 14 is disposed in the fourth partial frame region GAd, the drive signal supply line TSVCOM is also disposed in the fourth partial frame region GAd. The second wires LB-3, LB-4, and LB-5 disposed in the fourth partial frame region GAd out of the second wires LB are disposed not overlapping the drive signal supply line TSVCOM in the fourth partial frame region GAd similarly to the second wires LB-1 and LB-2 disposed in the second partial frame region GAb. If the second wires LB-3, LB-4, and LB-5 intersect the drive signal supply line TSVCOM in the first partial frame region GAa, the fourth shield wire LD4 may be provided overlapping the intersection region.

Third Embodiment

Figure 15:
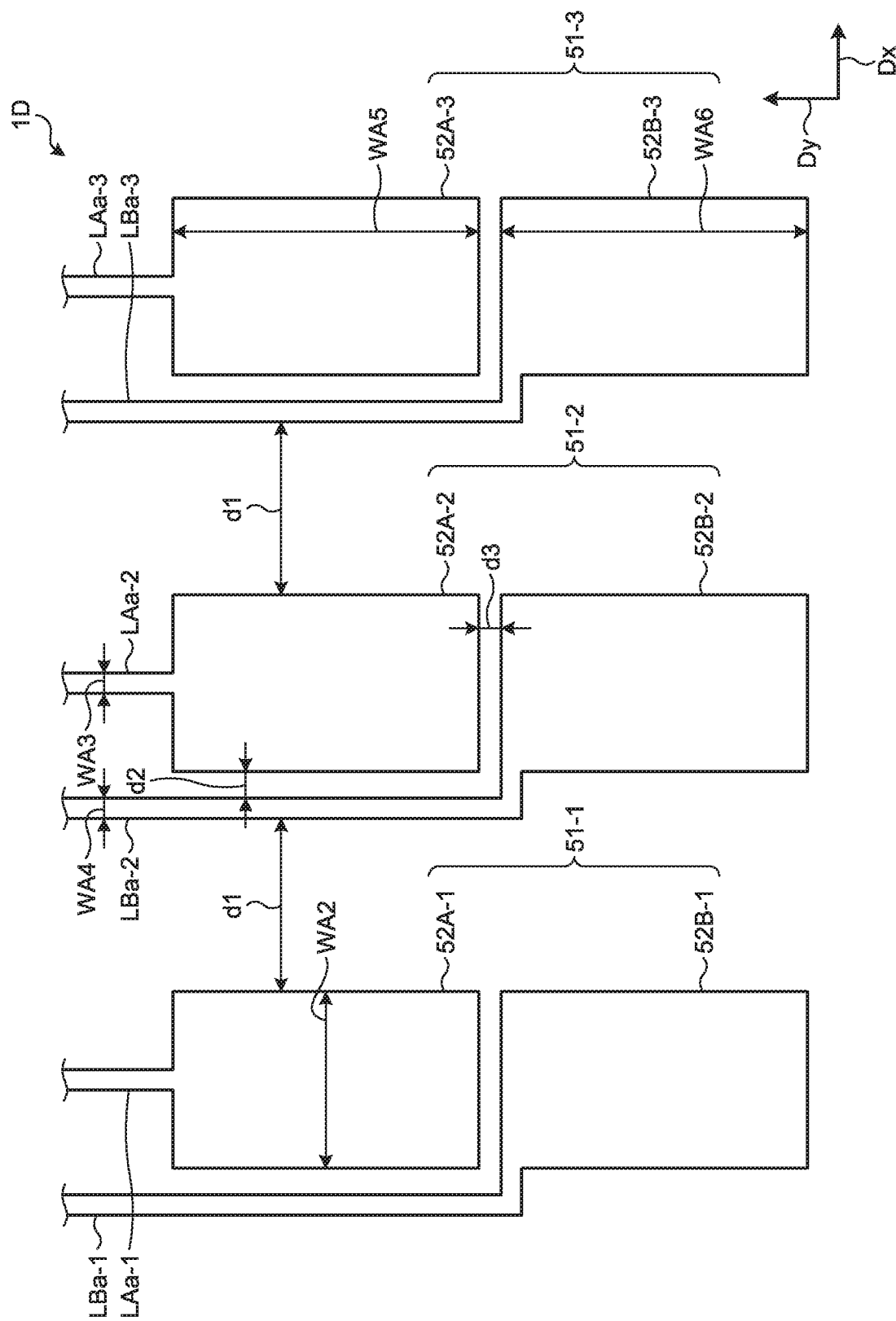
FIG. 15 is a plan view of the terminals according to a third embodiment of the present disclosure.

FIG. 15 is a plan view of the terminals according to a third embodiment of the present disclosure. FIG. 15 illustrates three terminals 51-1, 51-2, and 51-3 in an enlarged manner. The first partial terminal 52A-1 and the second partial terminal 52B-1 of the terminal 51-1 are coupled to the first electrode Rx-1 (refer to FIG. 5) via a first wire LAa-1 and a second wire LBa-1, respectively. Similarly, the first partial terminal 52A-2 and the second partial terminal 528-2 are coupled to the first electrode Rx-2 (refer to FIG. 5) via a first wire LAa-2 and a second wire LBa-2, respectively. The first partial terminal 52A-3 and the second partial terminal 52B-3 are coupled to the first electrode Rx-3 (refer to FIG. 5) via a first wire LAa-3 and a second wire LBa-3, respectively.

As illustrated in FIG. 15, in a display apparatus with a detection function 1D according to the present embodiment, the first wire LAa-1 is coupled to a first end of the first partial terminal 52A-1. A second end of the first partial terminal 52A-1 faces a first end of the second partial terminal 52B-1. The second wire LBa-1 is provided along one side of the first partial terminal 52A-1 and coupled to the first end of the second partial terminal 52B-1. Similarly, the first wires LAa-2 and LAa-3 and the second wires LBa-2 and LBa-3 are coupled to the first partial terminals 52A-2 and 52A-3 and the second partial terminals 52B-2 and 52B-3, respectively.

The second wires LBa according to the present embodiment are provided along the first wires LAa. The second wire LBa-2, for example, passes through a space between the first partial terminal 52A-1 and the first partial terminal 52A-2 disposed side by side in the first direction Dx and extends in the second direction Dy. The first wire LAa and the second wire LBa according to the present embodiment extend in the same direction from the positions where they are coupled to the first partial terminal 52A and the second partial terminal 52B, respectively. With this configuration, the first wire LAa and the second wire LBa are coupled to the first end Rxe1 (refer to FIG. 5) on the same side of the first electrode Rx. The first electrode Rx-1 (third electrode) illustrated in FIG. 5 is provided at a position overlapping the detection region AA of the first substrate 21 and extends in the second direction Dy. The terminals 51 include the terminal 51-1 (second terminal). The first wire LAa-1 (third wire) couples the first end Rxe1 in the second direction Dy of the first electrode Rx-1 (third electrode) and the terminal 51-1 (second terminal). The second wire LBa-1 (fourth wire) couples the second end Rxe2 opposite to the first end Rxe1 of the first electrode Rx-1 (third electrode) and the terminal 51-1 (second terminal). The second wire LBa-2 passes through a space between the first partial terminal 52A-2 of the terminal 51-2 (first terminal) and the first partial terminal 52A-1 of the terminal 51-1 (second terminal) and is coupled to the second partial terminal 52B-2.

Similarly to the example illustrated in FIG. 7, the first partial terminal 52A and the second partial terminal 52B are coupled to the single coupling terminal 76 of the wiring substrate 71. With this configuration, the first wire LAa and the second wire LBa are electrically coupled via the first partial terminal 52A, the coupling terminal 76, and the second partial terminal 52B.

With this configuration, if one of the first wire LAa and the second wire LBa is broken, the other thereof can secure coupling between the first electrode Rx and the wiring substrate 71. Consequently, the display apparatus with a detection function 1D can have higher reliability in coupling between the first electrodes Rx and the wiring substrate 71.

As illustrated in FIG. 15, a width WA2 of the first partial terminal 52A is 150 µm, for example. A width WA5 of the first partial terminal 52A and a width WA6 of the second partial terminal 52B in the second direction Dy are 150 µm to 200 µm, specifically 175 µm, for example. A width WA3 of the first wire LAa and a width WA4 of the second wire LBa are 5 µm, for example. A distance d1 between the first partial terminal 52A and the second wire LBa in the first direction Dx is 50 µm, for example. A distance d2 between the first partial terminal 52A and the second wire LBa in the first direction Dx is 5 µm, for example. A distance d3 between the first partial terminal 52A and the second partial terminal 52B in the second direction Dy is 5 µm, for example.

The first partial terminal 52A is electrically coupled to the second partial terminal 52B via the first wire LAa, the first electrode Rx, and the second wire LBa when the wiring substrate 71 is not coupled to the first partial terminal 52A nor the second partial terminal 52B. Also in the present embodiment, the first partial terminal 52A and the second partial terminal 52B can be used as terminals for an electrical characteristics inspection for the first wire LAa and the second wire LBa.

Fourth Embodiment

Figure 16:
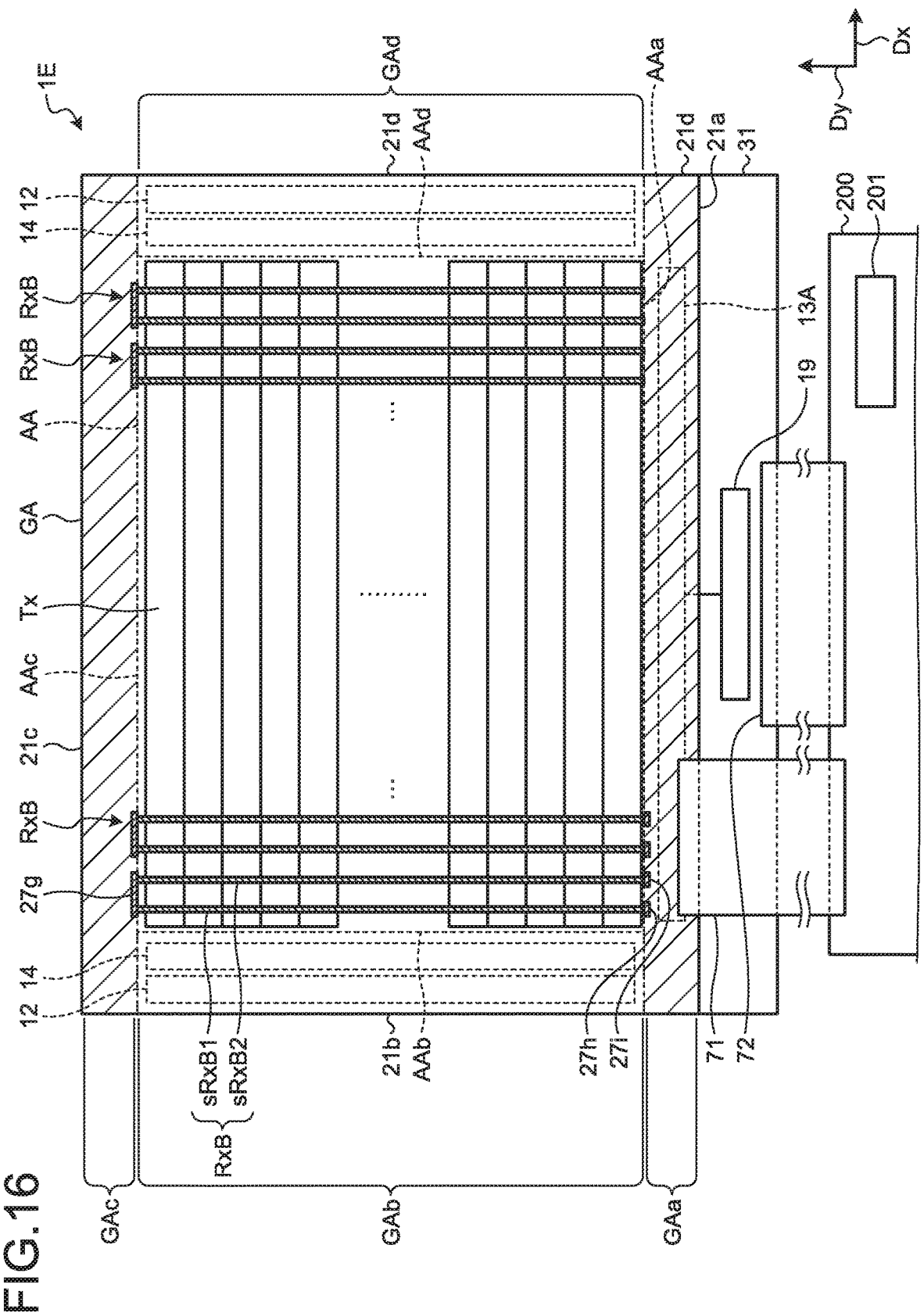
FIG. 16 is a plan view of the display apparatus with a detection function according to a fourth embodiment of the present disclosure.
Figure 17:
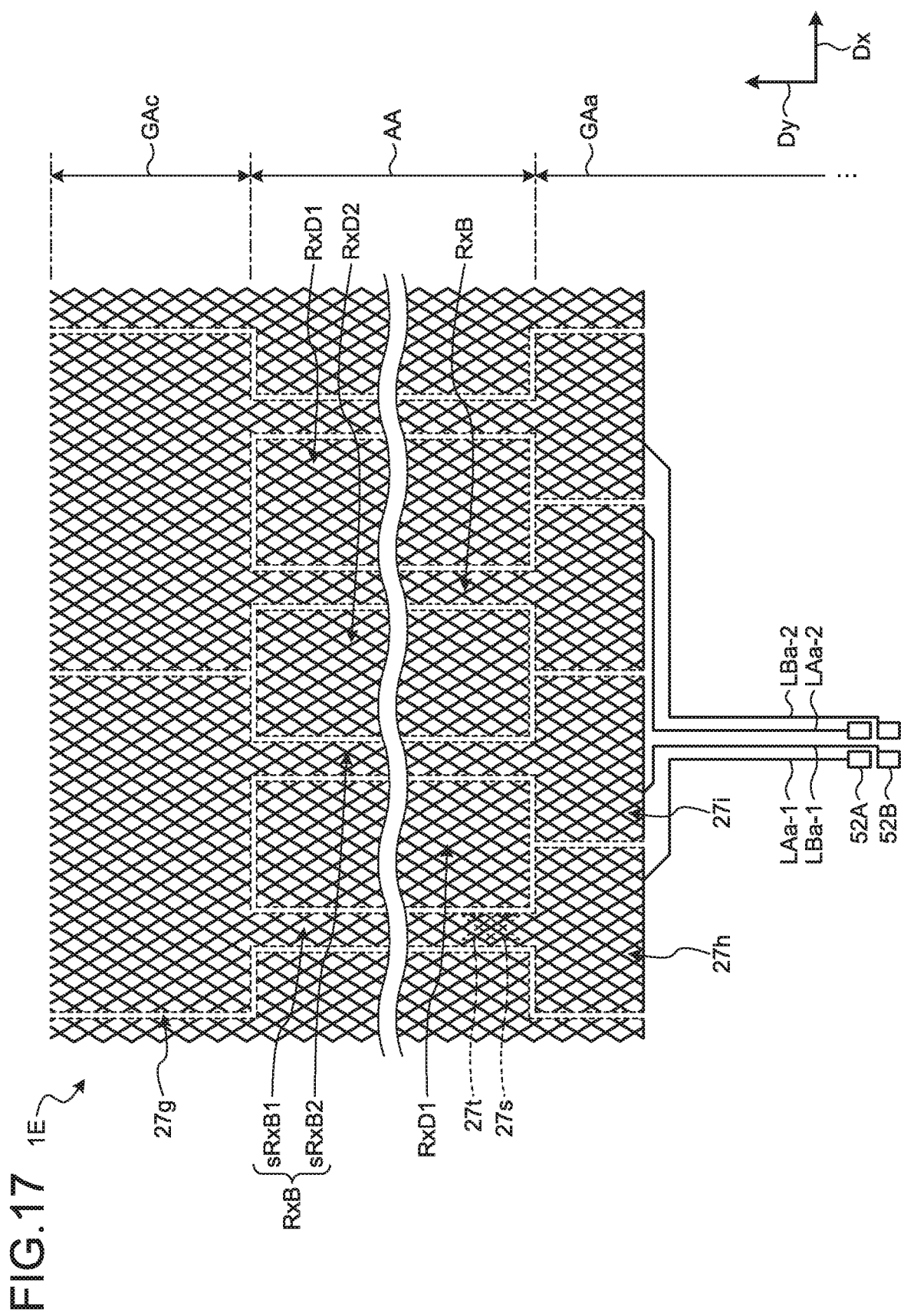
FIG. 17 is an enlarged plan view of the first electrodes according to the fourth embodiment.

FIG. 16 is a plan view of the display apparatus with a detection function according to a fourth embodiment of the present disclosure. FIG. 17 is an enlarged plan view of the first electrodes according to the fourth embodiment. As illustrated in FIG. 16, in a display apparatus with a detection function 1E according to the present embodiment, a first electrode RxB includes a first partial electrode sRxB1 and a second partial electrode sRxB2. The first partial electrode sRxB1 extends in the second direction Dy. The second partial electrode sRxB2 extends in the second direction Dy along the first partial electrode sRxB1. One end of the first partial electrode sRxB1 is coupled to one end of the second partial electrode sRxB2 via a coupling wire 27g. The other end of the first partial electrode sRxB1 is coupled to the first wire LAa (refer to FIG. 17) via a coupling wire 27h. The other end of the second partial electrode sRxB2 is coupled to the second wire LBa (refer to FIG. 17) via a coupling wire 27i.

One first electrode RxB includes the coupling wire 27h, the first partial electrode sRxB1, the coupling wire 27g, the second partial electrode sRxB2, and the coupling wire 27i and has a U-shape as a whole. One first electrode RxB extends in the second direction Dy as a whole. A plurality of first electrodes RxB are arrayed in the first direction Dx.

As illustrated in FIG. 17, the first partial electrode sRxB1 is a mesh-like wire including a plurality of third thin wires 27s and a plurality of fourth thin wires 27t. The third thin wires 27s and the fourth thin wires 27t extend in different directions and intersect each other. The third thin wires 27s and the fourth thin wires 27t are made of the same material as that of the first thin wires 27a and the second thin wires 27b. Similarly to the first partial electrode sRxB1, the second partial electrode sRxB2 is a mesh-like wire. The coupling wires 27g, 27h, and 27i are mesh-like wires including a plurality of thin wires similarly to the first partial electrode sRxB1 and the second partial electrode sRxB2.

The coupling wire 27g is provided in the third partial frame region GAc. The coupling wires 27h and 27i are provided in the first partial frame region GAa. The configuration is not limited thereto. Part or all of the coupling wires 27g, 27h, and 27i may be provided in the detection region AA. The coupling wires 27g, 27h, and 27i may have functions as detection electrodes.

In one first electrode RxB, a dummy electrode RxD1 is provided in the region surrounded by the first partial electrode sRxB1, the second partial electrode sRxB2, and the coupling wires 27g, 27h, and 27i. A dummy electrode RxD2 is provided between the first electrodes RxB disposed side by side. The dummy electrodes RxD1 and RxD2 are mesh-like wires including a plurality of thin wires similarly to the first partial electrode sRxB1 and the second partial electrode sRxB2. This configuration can suppress fluctuations in the light transmittance in the detection region AA and provide high visibility.

The first partial electrode sRxB1, the second partial electrode sRxB2, the coupling wires 27g, 27h, and 27i, and the dummy electrodes RxD1 and RxD2 may have a zigzag shape as illustrated in FIG. 13 or include a plurality of wavy metal thin wires.

The first wire LAa according to the present embodiment is coupled to the first partial terminal 52A, and the second wire LBa is coupled to the second partial terminal 52B. Similarly to the example illustrated in FIG. 7, the first partial terminal 52A and the second partial terminal 52B are coupled to one coupling terminal 76 via the conductive adhesive 63. With this configuration, the first partial electrode sRxB1 and the second partial electrode sRxB2 are electrically coupled to the wiring substrate 71 via the first partial terminal 52A, the coupling terminal 76, and the second partial terminal 52B. With this configuration, if one of the first wire LAa and the second wire LBa is broken, the other thereof can secure coupling between the first electrode RxB and the wiring substrate 71.

Fifth Embodiment

Figure 18:
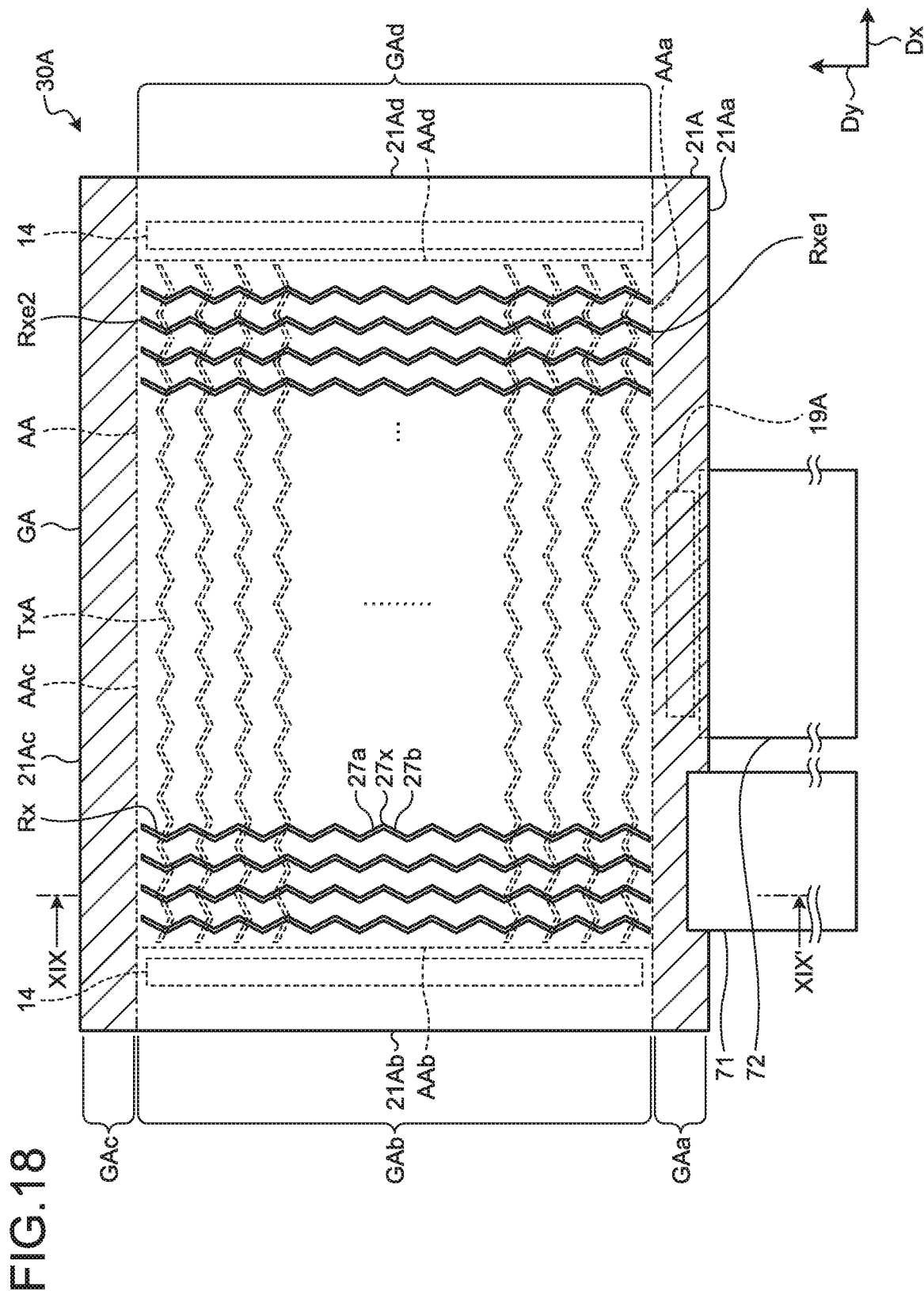
FIG. 18 is a plan view of a detection apparatus according to a fifth embodiment of the present disclosure.
Figure 19:
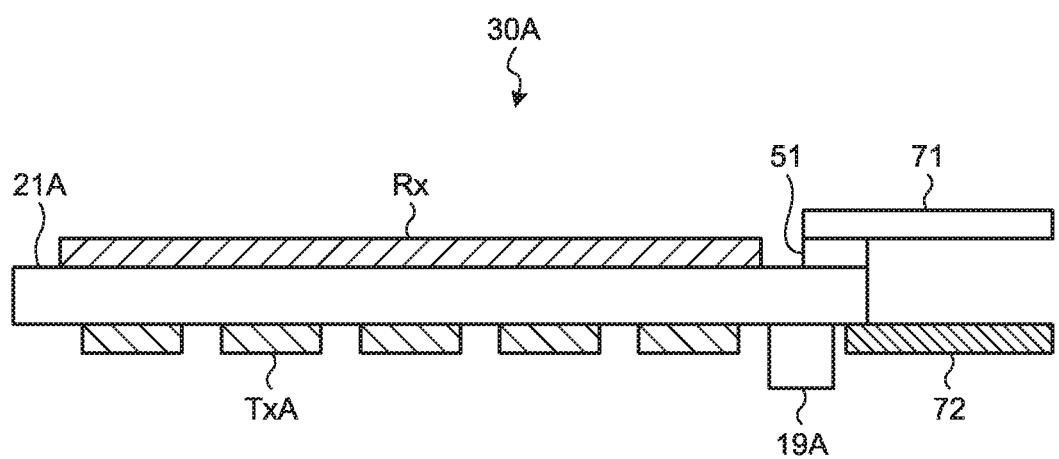
FIG. 19 is a sectional view along line XIX-XIX' of FIG. 18.

FIG. 18 is a plan view of the detection apparatus according to a fifth embodiment of the present disclosure. FIG. 19 is a sectional view along line XIX-XIX' of FIG. 18. While the first to the fourth embodiments describe the display apparatuses with a detection function 1, 1A, . . . , and 1E, the present disclosure is not limited thereto. The present disclosure may be applied not to a display apparatus but to a detection apparatus 30A alone. As illustrated in FIG. 19, for example, the detection apparatus 30A includes a first substrate 21A, the first electrodes Rx, and second electrodes TxA. The first electrodes Rx are disposed on a first surface, which is one of planes parallel with the detection region AA of the first substrate 21A. The second electrodes TxA are disposed on a second surface opposite to the first surface of the first substrate. As illustrated in FIG. 18, the second electrodes TxA are metal wires similar to the first electrodes Rx and have a zigzag shape. The drive electrode driver 14 and the drive signal supply line TSVCOM are disposed on the surface provided with the second electrodes TxA. The first wires LA and the second wires LB coupled to the first electrodes Rx are disposed on the surface provided with the first electrodes Rx and in a region overlapping the drive electrode driver 14 in the direction perpendicular to the detection region AA. Further explanation of the detection apparatus 30A is omitted because it has the same configuration as that of the detection apparatus 30 other than the configuration of the display panel 20.

The present embodiment may include an insulating layer instead of the first substrate 21A. The first substrate 21A has a rectangular shape with a first substrate side 21Aa, a second substrate side 21Ab, a third substrate side 21Ac, and a fourth substrate side 21Ad. The first substrate 21A may have another shape, such as a polygonal shape. The second electrodes TxA may have another shape, such as a wavy, linear, or mesh shape. The second electrodes TxA are not necessarily metal wires having a zigzag shape like the first electrodes Rx and may be made of a transparent conductive substance, such as ITO, similarly to the other embodiments.

While exemplary embodiments according to the present disclosure have been described, the embodiments are not intended to limit the disclosure. The contents disclosed in the embodiments are given by way of example only, and various changes may be made without departing from the spirit of the disclosure. Appropriate changes made without departing from the spirit of the disclosure naturally fall within the scope of the disclosure. At least one of various omissions, substitutions, and changes of the components may be made without departing from the spirit of the embodiments above and the modifications thereof.

The shape and the size of the terminals, for example, are given by way of example only and may be appropriately modified. The length in the first direction Dx or the length in the second direction Dy of the first partial terminals 52A illustrated in FIG. 6 and other figures may be different from each other. The length in the first direction Dx or the length in the second direction Dy of the second partial terminals 52B may also be different from each other. While the embodiments have described the first electrodes Rx, the first wire and the second wire may be coupled to the second electrode Tx, and the first wire LA and the second wire LB may be coupled to one terminal 51.

What is claimed is:
1. A detection apparatus comprising:
a first substrate;
a detection region having a first detection side extending along a first direction parallel with a surface of the first substrate and a second detection side extending along a second direction intersecting the first direction;
a frame region provided outside the detection region and having a first frame region extending along the first detection side and a second frame region extending along the second detection side;
a first electrode provided at a position overlapping the detection region of the first substrate, the first electrode extending in the second direction;
a second electrode provided at a position overlapping the detection region, the second electrode extending in the first direction;
a plurality of terminals provided in the first frame region of the first substrate and arrayed in the first direction, and including a first terminal;
a first wire that couples a first end of the first electrode in the second direction and the first terminal;
a second wire provided in the second frame region of the first substrate and coupling a second end opposite to the first end of the first electrode and the first terminal,
a second substrate facing the first substrate and provided with the second electrode; and
a drive signal supply line provided in the second frame region of the second substrate and configured to supply a drive signal to the second electrode,
wherein
the second wire is provided at a position not overlapping the drive signal supply line in the second frame region in planar view, and
the second wire is provided at a position farther away from the second detection side than the drive signal supply line in the second frame region in planar view, the second wire intersecting the drive signal supply line and coupled to the first terminal.
2. The detection apparatus according to claim 1, further comprising:
a third electrode provided at a position overlapping the detection region of the first substrate, the third electrode extending in the second direction;
a third wire; and
a fourth wire,
wherein
the terminal includes a second terminal,
the third wire couples a first end of the third electrode in the second direction and the second terminal,
the fourth wire couples a second end opposite to the first end of the third electrode and the second terminal, and
the fourth wire is provided between the second detection side and the drive signal supply line in the second frame region in planar view.
3. The detection apparatus according to claim 1 further comprising:
a drive circuit including a shift register and a switching element, wherein
the drive signal supply line is coupled to the second electrode via the switching element.
4. The detection apparatus according to claim 1, further comprising:
a third electrode provided at a position overlapping the detection region of the first substrate, the third electrode extending in the second direction;
a third wire; and
a fourth wire,
wherein
the terminal includes a second terminal,
the third wire couples a first end of the third electrode in the second direction and the second terminal,
the fourth wire couples a second end opposite to the first end of the third electrode and the second terminal, and the fourth wire is provided in a fourth frame region opposite to the second frame region in the first direction.

5. The detection apparatus according to claim 1, wherein a ratio of resistance between the first wire and the second wire is 0.21 to 0.24.

6. A display apparatus with a detection function comprising:
the detection apparatus according to claim 1; and
a display layer configured to display an image, wherein a display drive signal is supplied to at least one of the first electrode and the second electrode in a period for displaying the image.

7. A detection apparatus comprising:
a first substrate;
a detection region having a first detection side extending along a first direction parallel with a surface of the first substrate and a second detection side extending along a second direction intersecting the first direction;
a frame region provided outside the detection region and having a first frame region extending along the first detection side and a second frame region extending along the second detection side;
a first electrode provided at a position overlapping the detection region of the first substrate, the first electrode extending in the second direction;
a second electrode provided at a position overlapping the detection region, the second electrode extending in the first direction;
a plurality of terminals provided in the first frame region of the first substrate and arrayed in the first direction, and including a first terminal;
a first wire that couples a first end of the first electrode in the second direction and the first terminal;
a second wire provided in the second frame region of the first substrate and coupling a second end opposite to the first end of the first electrode and the first terminal;
a second substrate facing the first substrate and provided with the second electrode; and
a drive signal supply line provided in the second frame region of the second substrate and configured to supply a drive signal to the second electrode,
wherein
the second wire is provided at a position not overlapping the drive signal supply line in the second frame region in planar view,
a first shield wire is provided at a position overlapping the drive signal supply line in the second frame region of the first substrate, and
the first shield wire is supplied with a signal having same electric potential as an electric potential of a signal supplied to the first electrodes.

8. The detection apparatus according to claim 7, further comprising:
a third electrode provided at a position overlapping the detection region of the first substrate, the third electrode extending in the second direction;
a third wire; and
a fourth wire,
wherein
the terminal includes a second terminal,
the third wire couples a first end of the third electrode in the second direction and the second terminal,
the fourth wire couples a second end opposite to the first end of the third electrode and the second terminal, and
the first shield wire is disposed between a first wire and the fourth wire in the first direction.

9. The detection apparatus according to claim 7, wherein a second shield wire is provided surrounding the second wire in the frame region of the first substrate.

10. The detection apparatus according to claim 9, wherein a third shield wire is provided between the first wire and the second wire disposed in the first frame region of the first substrate.

11. A detection apparatus comprising:
a first substrate;
a detection region having a first detection side extending along a first direction parallel with a surface of the first substrate and a second detection side extending along a second direction intersecting the first direction;
a frame region provided outside the detection region and having a first frame region extending along the first detection side and a second frame region extending along the second detection side;
a first electrode provided at a position overlapping the detection region of the first substrate, the first electrode extending in the second direction;
a second electrode provided at a position overlapping the detection region, the second electrode extending in the first direction;
a plurality of terminals provided in the first frame region of the first substrate and arrayed in the first direction, and including a first terminal;
a first wire that couples a first end of the first electrode in the second direction and the first terminal; and
a second wire provided in the second frame region of the first substrate and coupling a second end opposite to the first end of the first electrode and the first terminal,
wherein
the first terminal includes a first partial terminal and a second partial terminal,
the first partial terminal and the second partial terminal are separated in the second direction and electrically coupled to a coupling terminal on a wiring substrate,
the first wire is coupled to the first partial terminal, and
the second wire is coupled to the second partial terminal.

12. The detection apparatus according to claim 11, further comprising:
a third electrode provided at a position overlapping the detection region of the first substrate, the third electrode extending in the second direction;
a third wire; and
a fourth wire,
wherein
the terminal includes a second terminal,
the third wire couples a first end of the third electrode in the second direction and the second terminal,
the fourth wire couples a second end opposite to the first end of the third electrode and the second terminal, and
the second wire passes through a space between the first partial terminal of the first terminal and the first partial terminal of the second terminal and is coupled to the second partial terminal.

13. A detection apparatus comprising:
a first substrate;
a detection region having a first detection side extending along a first direction parallel with a surface of the first substrate;
a frame region provided outside the detection region and having a first frame region extending along the first detection side;

a first electrode provided at a position overlapping the detection region of the first substrate, the first electrode extending in a second direction intersecting the first direction;

a second electrode provided at a position overlapping the detection region, the second electrode extending in the first direction;

a plurality of terminals provided in the first frame region of the first substrate, arrayed in the first direction, and including a first terminal;

a first wire and a second wire that couple the first electrode and the first terminal; and a dummy electrode provided between the first partial electrode and the second partial electrode and separated from the first partial electrode and the second partial electrode, wherein the first electrode includes a first partial electrode and a second partial electrode, the first partial electrode and the second partial electrode are provided along the second direction, and electrically coupled at respective first ends, the first wire is coupled to a second end of the first partial electrode, and the second wire is coupled to a second end of the second partial electrode.

14. The detection apparatus according to claim 1, wherein the first electrode includes a first thin wire and a second thin wire extending in different directions.

* * * * *